United States Patent
Kwag

(10) Patent No.: US 11,837,738 B2
(45) Date of Patent: Dec. 5, 2023

(54) BATTERY PACK

(71) Applicant: SAMSUNG SDI CO., LTD., Yongin-si (KR)

(72) Inventor: Nohyun Kwag, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 115 days.

(21) Appl. No.: 17/106,290

(22) Filed: Nov. 30, 2020

(65) Prior Publication Data

US 2021/0167345 A1 Jun. 3, 2021

(30) Foreign Application Priority Data

Nov. 29, 2019 (KR) .................. 10-2019-0157487

(51) Int. Cl.
*H01M 50/20* (2021.01)
*H01M 50/502* (2021.01)

(52) U.S. Cl.
CPC ......... *H01M 50/20* (2021.01); *H01M 50/502* (2021.01); *H01M 2220/20* (2013.01)

(58) Field of Classification Search
CPC ............... H01M 50/20; H01M 50/502; H01M 2220/20; H01M 50/213; H01M 50/204; H01M 10/4207; H01M 50/572; H01M 2200/103; Y02E 60/10
See application file for complete search history.

(56) References Cited

U.S. PATENT DOCUMENTS

| | | | |
|---|---|---|---|
| 7,683,575 B2 | 3/2010 | Berdichevsky et al. |
| 8,241,772 B2 | 8/2012 | Hermann et al. |
| 8,322,393 B2 | 12/2012 | Hermann et al. |
| 9,627,151 B2 | 4/2017 | Sengoku et al. |
| 10,158,102 B2 | 12/2018 | Wu et al. |
| 10,305,074 B2 | 5/2019 | Yoon |
| 10,396,406 B2 | 8/2019 | Lee |
| 10,811,734 B2 | 10/2020 | Gong et al. |
| 10,978,689 B2 | 4/2021 | Kwag et al. |
| 11,233,285 B2 | 1/2022 | Kang |
| 11,462,799 B2 | 10/2022 | Ahn et al. |
| 2005/0110458 A1 | 5/2005 | Seman, Jr. et al. |
| 2009/0148754 A1 | 6/2009 | Marchio et al. |

(Continued)

FOREIGN PATENT DOCUMENTS

| CN | 203481285 U | 3/2014 |
|---|---|---|
| CN | 206976514 U | 2/2018 |

(Continued)

OTHER PUBLICATIONS

Machine English translation of JP 2009-187734 (Year: 2009).*

(Continued)

*Primary Examiner* — Michael L Dignan
(74) *Attorney, Agent, or Firm* — Lee IP Law, P.C.

(57) ABSTRACT

A battery pack including battery cells bounded by an imaginary rectangular envelope including a pair of long sides and a pair of short sides extending to linearly surround an outer periphery of the battery cells across an outer circumference of the battery cells; and bus bars that electrically connect at least some of the battery cells to each other, the bus bars being arranged to extend in a zig-zag shape along a short side direction of the imaginary rectangular envelope.

17 Claims, 19 Drawing Sheets

(56) References Cited

U.S. PATENT DOCUMENTS

| | | |
|---|---|---|
| 2010/0047676 A1 | 2/2010 | Park et al. |
| 2010/0047682 A1 | 2/2010 | Houchin-Miller et al. |
| 2010/0062329 A1 | 3/2010 | Muis |
| 2010/0124693 A1 | 5/2010 | Kosugi et al. |
| 2011/0027622 A1 | 2/2011 | Hong |
| 2011/0223452 A1 | 9/2011 | Yoshida et al. |
| 2012/0058368 A1 | 3/2012 | Yamamoto et al. |
| 2012/0135296 A1* | 5/2012 | Itoi ............... H01M 50/502 429/159 |
| 2012/0189885 A1 | 7/2012 | Kishii et al. |
| 2012/0301747 A1 | 11/2012 | Han et al. |
| 2014/0050967 A1* | 2/2014 | Fuhr ............... H01M 50/30 429/158 |
| 2014/0227570 A1 | 8/2014 | Hoshi et al. |
| 2014/0255748 A1 | 9/2014 | Jan et al. |
| 2015/0118530 A1 | 4/2015 | Lee |
| 2015/0295280 A1 | 10/2015 | Cho et al. |
| 2015/0349389 A1 | 12/2015 | Kobune et al. |
| 2016/0035497 A1 | 2/2016 | Sengoku et al. |
| 2016/0141585 A1 | 5/2016 | Berg et al. |
| 2018/0269536 A1 | 9/2018 | Wei et al. |
| 2018/0316073 A1 | 11/2018 | Ruehle et al. |
| 2018/0358671 A1 | 12/2018 | Halsey et al. |
| 2018/0366697 A1 | 12/2018 | Effering et al. |
| 2019/0067655 A1 | 2/2019 | Nakamura et al. |
| 2019/0140235 A1 | 5/2019 | Lindstrom et al. |
| 2020/0076022 A1 | 3/2020 | Kawakami et al. |
| 2020/0112007 A1 | 4/2020 | Kwag |
| 2020/0147673 A1 | 5/2020 | Rodenburg et al. |
| 2020/0203788 A1 | 6/2020 | Kang |
| 2020/0220147 A1 | 7/2020 | Haino et al. |
| 2020/0251702 A1 | 8/2020 | Seol et al. |
| 2020/0365866 A1 | 11/2020 | Lin et al. |
| 2021/0083255 A1 | 3/2021 | Demont et al. |
| 2021/0359358 A1* | 11/2021 | George ............... H01M 10/613 |

FOREIGN PATENT DOCUMENTS

| | | | |
|---|---|---|---|
| CN | 108598311 A | 9/2018 | |
| DE | 102013207357 A1 | 10/2014 | |
| DE | 10 2016 206 463 A1 | 10/2017 | |
| DE | 102016206463 A1 | 10/2017 | |
| EP | 2 187 465 A1 | 5/2010 | |
| EP | 2 866 295 A | 4/2015 | |
| EP | 3 637 498 A | 4/2020 | |
| JP | 2006-156171 A | 6/2003 | |
| JP | 4193328 B2 | 12/2008 | |
| JP | 2009-187734 * | 8/2009 | ............... H01M 2/20 |
| JP | 2009-187734 A | 8/2009 | |
| JP | 5294575 B2 | 9/2013 | |
| JP | 2014-179289 A | 9/2014 | |
| JP | 2014-197452 A | 10/2014 | |
| JP | 2015-138748 A | 7/2015 | |
| JP | 5873210 B2 | 3/2016 | |
| JP | 2016-534518 A | 11/2016 | |
| JP | 6148406 B2 | 6/2017 | |
| JP | 2018-005984 A | 1/2018 | |
| JP | 2018-116775 A | 7/2018 | |
| KR | 10-2015-0048501 A | 5/2015 | |
| KR | 10-2016-0020645 A | 2/2016 | |
| KR | 10-2016-0138994 A | 12/2016 | |
| KR | 10-2017-0089247 A | 8/2017 | |
| KR | 10-2018-0068993 A | 6/2018 | |
| KR | 10-2018-0088197 A | 8/2018 | |
| KR | 10-2018-0129115 A | 12/2018 | |
| KR | 10-2019-0034019 A | 1/2019 | |
| KR | 10-2019-0022485 A | 3/2019 | |
| KR | 10-2019-0034020 A | 4/2019 | |
| KR | 10-2019-0086853 A | 7/2019 | |
| KR | 10-2019-0087744 A | 7/2019 | |
| KR | 10-2017-0021519 A | 2/2022 | |
| WO | WO 2007/134198 * | 11/2007 | ............... H01M 2/10 |
| WO | WO 2009/011748 A1 | 1/2009 | |
| WO | WO 2014/125642 A1 | 8/2014 | |
| WO | WO 2015/066078 A1 | 5/2015 | |
| WO | WO 2017/047258 A1 | 3/2017 | |
| WO | WO 2018/221004 A1 | 12/2018 | |
| WO | WO 2019/021980 A1 | 1/2019 | |
| WO | WO 2019/143060 A1 | 7/2019 | |
| WO | WO 2019/182117 A1 | 9/2019 | |
| WO | WO 2020/058694 A1 | 3/2020 | |

OTHER PUBLICATIONS

Machine English translation of JP 2018-005984 (Year: 2018).*
Extended European Search Report dated Jul. 21, 2021 for corresponding EP Patent Application No. 20210430.3 (U.S. Appl. No. 17/106,256).
Extended European Search Report dated Jul. 23, 2021 for corresponding EP Patent Application No. 20210460.0 (U.S. Appl. No. 17/106,297).
U.S. Appl. No. 17/106,247, filed Nov. 30, 2020.
U.S. Appl. No. 17/106,256, filed Nov. 30, 2020.
U.S. Appl. No. 17/106,282, filed Nov. 30, 2020.
U.S. Appl. No. 17/106,297, filed Nov. 30, 2020.
U.S. Appl. No. 17/106,303, filed Nov. 30, 2020.
Extended European Search Report dated Mar. 17, 2021 for corresponding EP Patent Applicant No. 20210417.0 (U.S. Appl. No. 17/106,303).
Extended European Search Report dated Mar. 22, 2021 for corresponding EP Patent Applicant No. 20210426.1 (U.S. Appl. No. 17/106,247).
Extended European Search Report dated Mar. 22, 2021 for corresponding EP Patent Applicant No. 20210423.8 (U.S. Appl. No. 17/106,290).
Partial European Search Report dated Mar. 26, 2021 for corresponding EP Patent Applicant No. 20210460.0 (U.S. Appl. No. 17/106,297).
Partial European Search Report dated Mar. 31, 2021 for corresponding EP Patent Applicant No. 20210430.3 (U.S. Appl. No. 17/106,256).
Extended European Search Report dated Apr. 22, 2021 for corresponding EP Patent Applicant No. 20210464.2 (U.S. Appl. No. 17/106,282).
Korean Office action dated Jul. 18, 2022 for related KR Patent Application No. 10-2019-0157466 (U.S. Appl. No. 17/106,303).
USPTO Office action dated May 10, 2022 for U.S. Appl. No. 17/106,282.
USPTO Office action dated Jul. 13, 2022 for U.S. Appl. No. 17/106,297.
USPTO Final Rejection dated Aug. 26, 2022 for U.S. Appl. No. 17/106,282.
USPTO Rejection dated Aug. 26, 2022 for U.S. Appl. No. 17/106,303.
Korean Office action dated Aug. 23, 2022 for corresponding KR Patent Application No. 10-2019-0157680.
USPTO Rejection dated Nov. 10, 2022 for related U.S. Appl. No. 17/106,247.
Korean Office action dated Oct. 21, 2022 for corresponding KR Patent Application No. 10-2019-0157508.
USPTO Final Rejection dated Feb. 10, 2023 for U.S. Appl. No. 17/106,297.
Korean Office action dated Nov. 8, 2022 in corresponding KR Patent Application No. 10- 2019-0157693.
European Office action dated Feb. 9, 2023.

* cited by examiner

BATTERY PACK

CROSS-REFERENCE TO RELATED APPLICATION

Korean Patent Application No. 10-2019-0157487, filed on Nov. 29, 2019, in the Korean Intellectual Property Office, and entitled: "Battery Pack," is incorporated by reference herein in its entirety.

BACKGROUND

1. Field

Embodiments relate to a battery pack.

2. Description of Related Art

A secondary battery may be charged and discharged, unlike a primary battery that may not be recharged. A secondary battery may be used as an energy source for mobile devices, electric vehicles, hybrid vehicles, electric bicycles, uninterruptible power supplies, and so on, and is used in the form of a single battery cell depending on types of external devices to be applied, or is used in the form of a battery pack in which multiple battery cells are connected to each other to be composed of one unit.

Small mobile devices such as mobile phones may operate for a predetermined period of time with an output and capacity of a single battery, but when electric vehicles and hybrid vehicles that consume much power require long-time driving and high-power driving, a battery pack may be used due to an output and a capacity, and the battery pack may increase an output voltage or an output current according to the number of built-in battery cells.

SUMMARY

The embodiments may be realized by providing a battery pack including battery cells bounded by an imaginary rectangular envelope including a pair of long sides and a pair of short sides extending to linearly surround an outer periphery of the battery cells across an outer circumference of the battery cells; and bus bars that electrically connect at least some of the battery cells to each other, the bus bars being arranged to extend in a zig-zag shape along a short side direction of the imaginary rectangular envelope.

Each of the battery cells may be a circular battery cell, and the battery cells may be arranged in an offset manner such that one battery cell is partially between adjacent battery cells.

The battery cells may be arranged such that a straight line of battery cells extend along a long side direction of the imaginary rectangular envelope; and a zig-zag line of battery cells extend along the short side direction of the imaginary rectangular envelope.

The bus bars may be arranged in the zig-zag shape while connecting adjacent battery cells along the short side direction of the imaginary rectangular envelope.

The bus bars may be arranged such that some of the bus bars are arranged in the zig-zag shape along the short side direction of the imaginary rectangular envelope; and remaining ones of the bus bars are arranged to extend lengthwise in the long side direction of the imaginary rectangular envelope.

A number of bus bars arranged in the zig-zag shape along the short side direction of the imaginary rectangular envelope may be greater than a number of bus bars arranged to extend lengthwise in the long side direction of the imaginary rectangular envelope.

The battery cells may include a low-potential battery cell having a lowest potential and a high-potential battery cell having a highest potential, and first and second output terminals may be respectively connected to the low-potential battery cell and the high-potential battery cell.

The first and second output terminals may be arranged along a long side direction of the imaginary rectangular envelope.

The battery pack may further include first and second fuse terminals respectively connected to a pair of adjacent battery cells between the low-potential battery cell and the high-potential battery cell in an electrical connection direction in which the bus bars are arranged.

The bus bars may include a low voltage portion extending from the first output terminal to the first fuse terminal; and a high voltage portion extending from the second output terminal to the second fuse terminal.

The first and second fuse terminals may be respectively close to the first and second output terminals in the electrical connection direction in which the bus bars are arranged.

The low voltage portion and the high voltage portion may be formed asymmetrically with respect to a virtual line that crosses between the first and second fuse terminals and is parallel to the short side direction of the imaginary rectangular envelope.

A number of bus bars in the high voltage portion may be larger than a number of bus bars in the low voltage portion.

The high voltage portion may include a high voltage deflection portion that crosses the virtual line toward the low voltage portion in the long side direction of the imaginary rectangular envelope.

The low voltage portion may include a low voltage deflection portion close to a side opposite to the high voltage deflection portion in the short side direction of the imaginary rectangular envelope and spaced apart from the high voltage deflection portion.

The low voltage deflection portion may be arranged at a position proximate to the first and second fuse terminals in the short side direction of the imaginary rectangular envelope, and the high voltage deflection portion may be arranged at a position distal to the first and second fuse terminals in the short side direction of the imaginary rectangular envelope.

The high voltage deflection portion may extend longer in the long side direction of the imaginary rectangular envelope than in the short side direction of the imaginary rectangular envelope, and the low voltage deflection portion may extend relatively longer in the short side direction of the imaginary rectangular envelope than in the long side direction of the imaginary rectangular envelope.

The bus bars may be alternately arranged over and below the battery cells in a height direction of the battery cells.

The battery pack may further include a cell holder in which the battery cells are accommodated, wherein the bus bars are alternately arranged over and below the cell holder in the height direction of the battery cells.

The battery pack may include arrays of the bus bars arranged to extend in the zig-zag shape along the short side direction of the imaginary rectangular envelope, the arrays being repeatedly arranged along a long side direction of the imaginary rectangular envelope.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
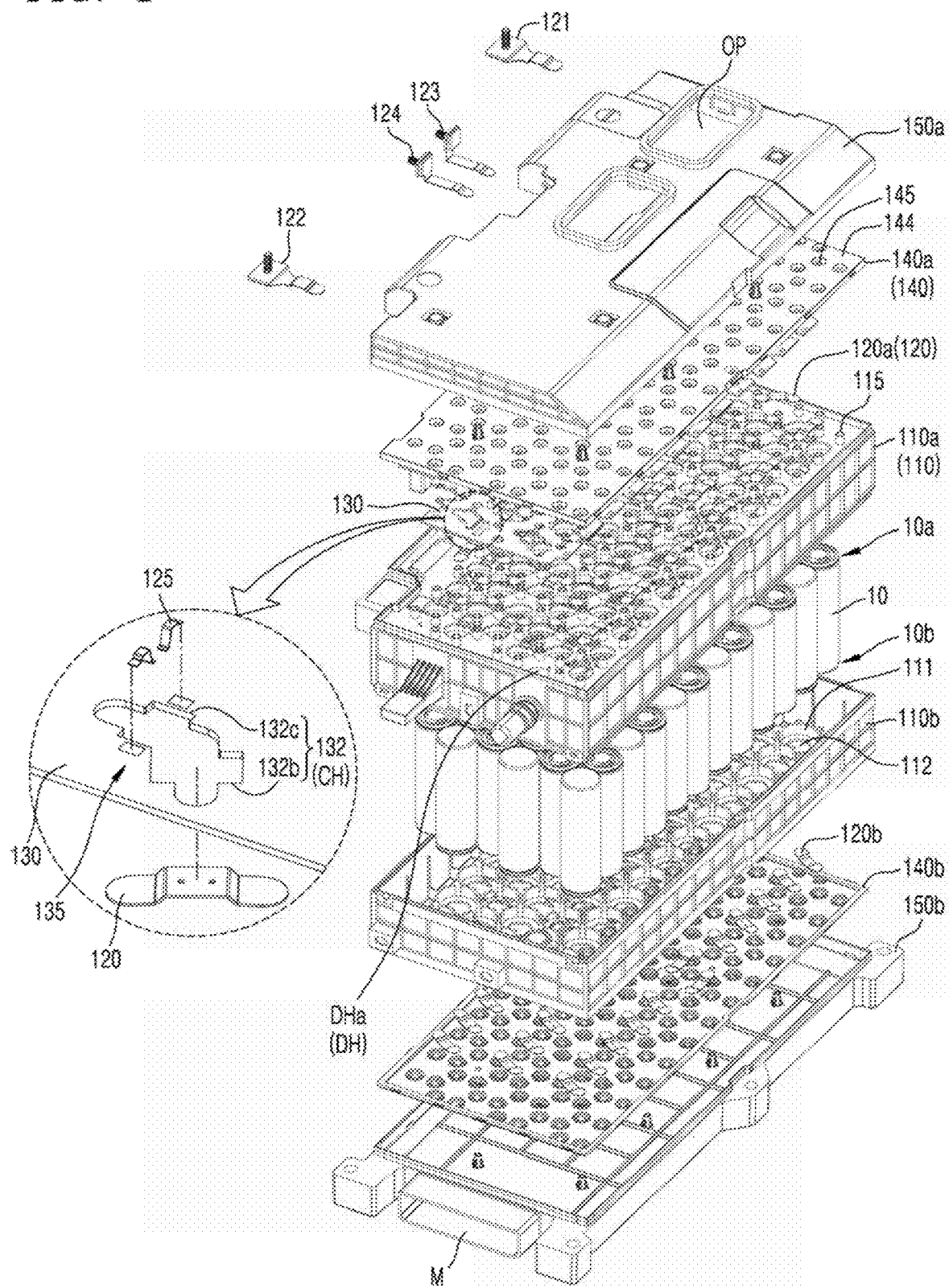
FIG. 1 is an exploded perspective view of a battery pack according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

As used herein, the terms "or" and "and/or" include any and all combinations of one or more of the associated listed items. Expressions such as "at least one of," when preceding a list of elements, modify the entire list of elements and do not modify the individual elements of the list.

Hereinafter, a battery pack according to an embodiment will be described with reference to the accompanying drawings.

Figure 2:
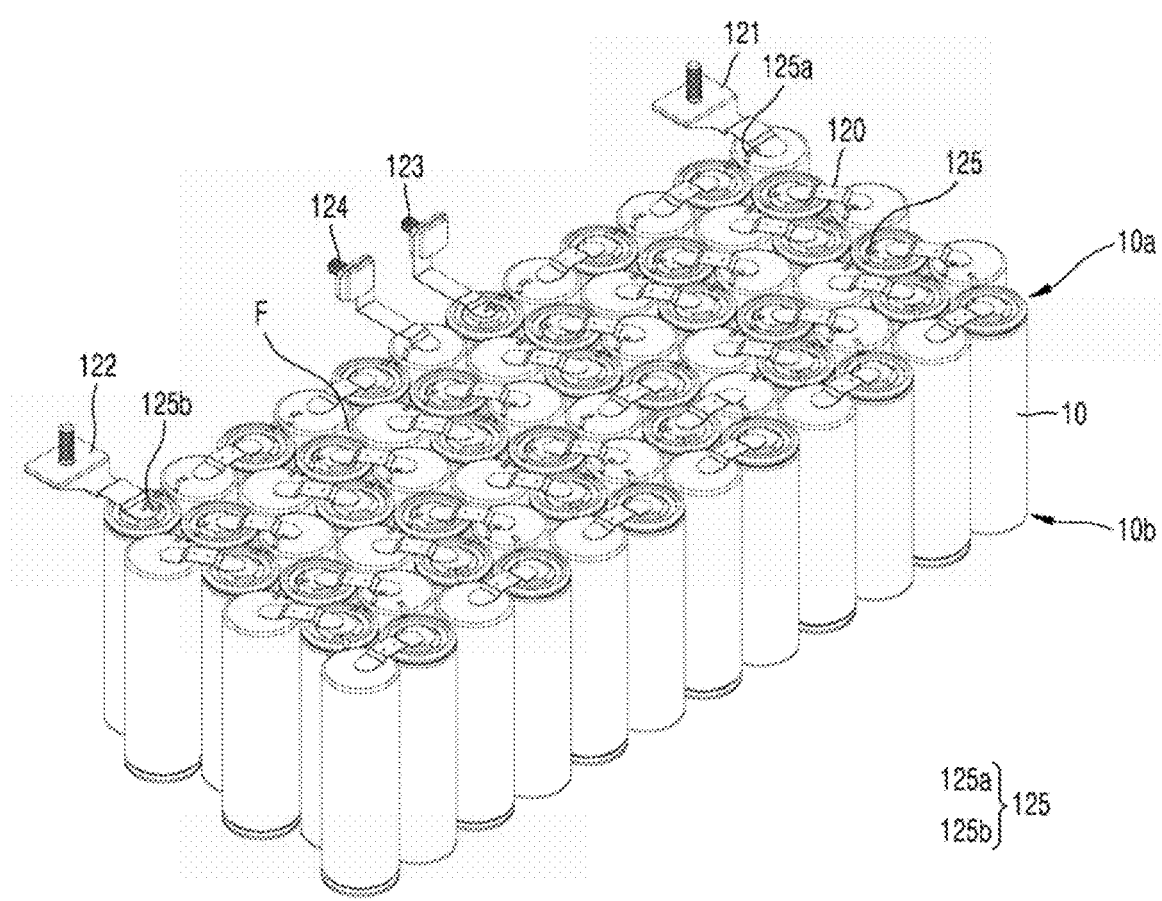
FIGS. 2 and 3 illustrate perspective views of battery cells of FIG. 1.
Figure 3:
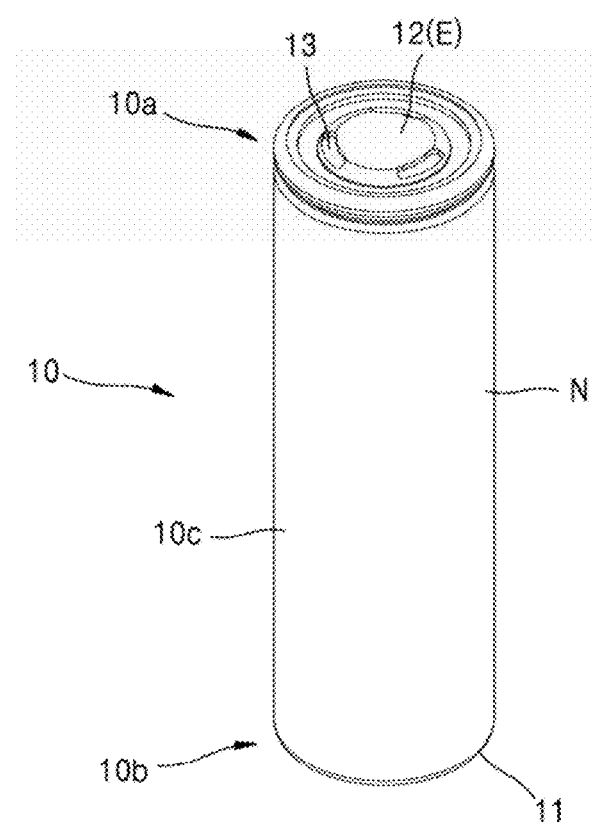
Figure 4:
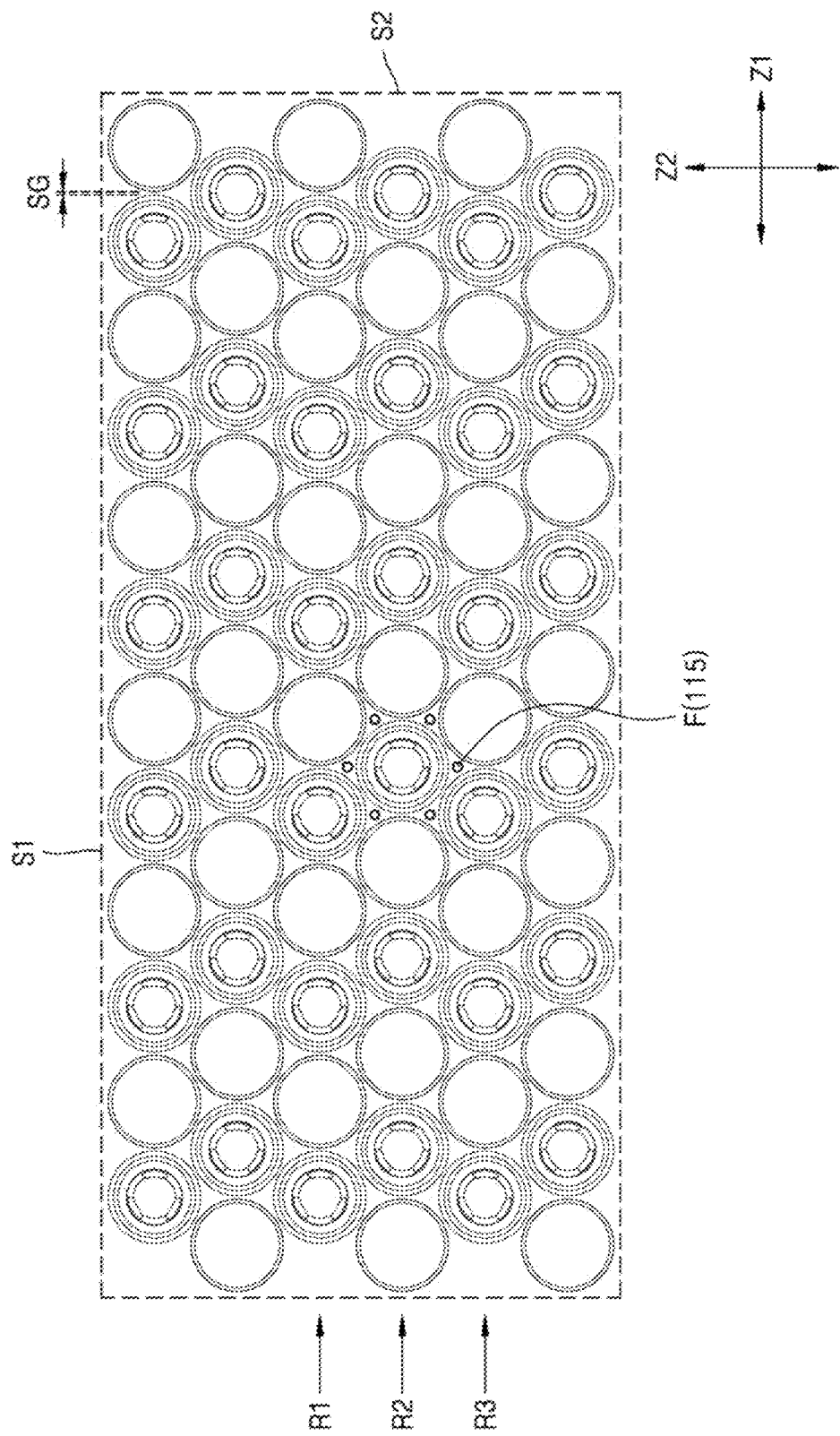
FIG. 4 is a view of the battery cell of FIG. 3 and showing cooling flow paths.
Figure 5:
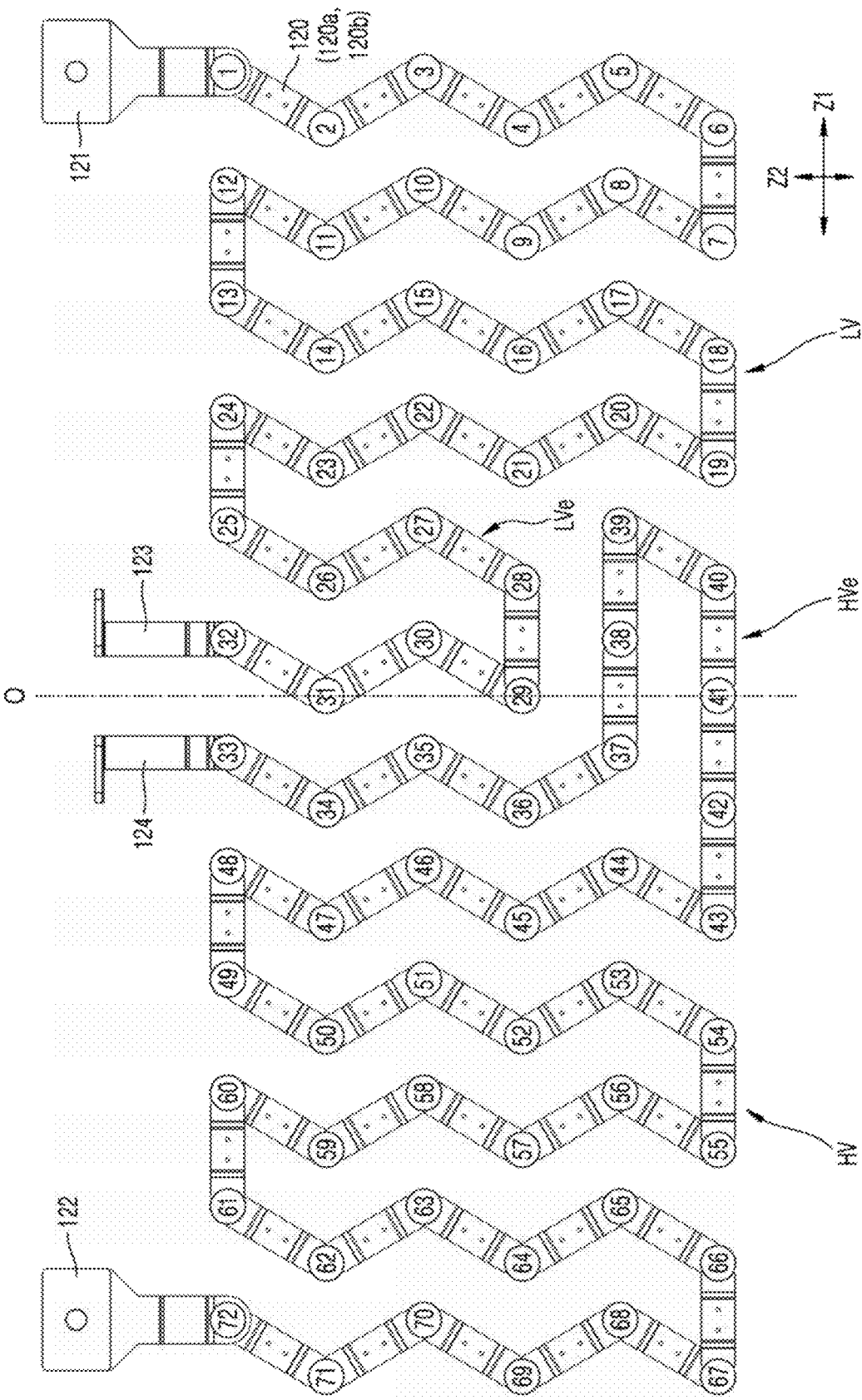
FIG. 5 is a view of an arrangement of multiple bus bars or an electrical connection of battery cells in which multiple bus bars are arranged.
Figure 6A:
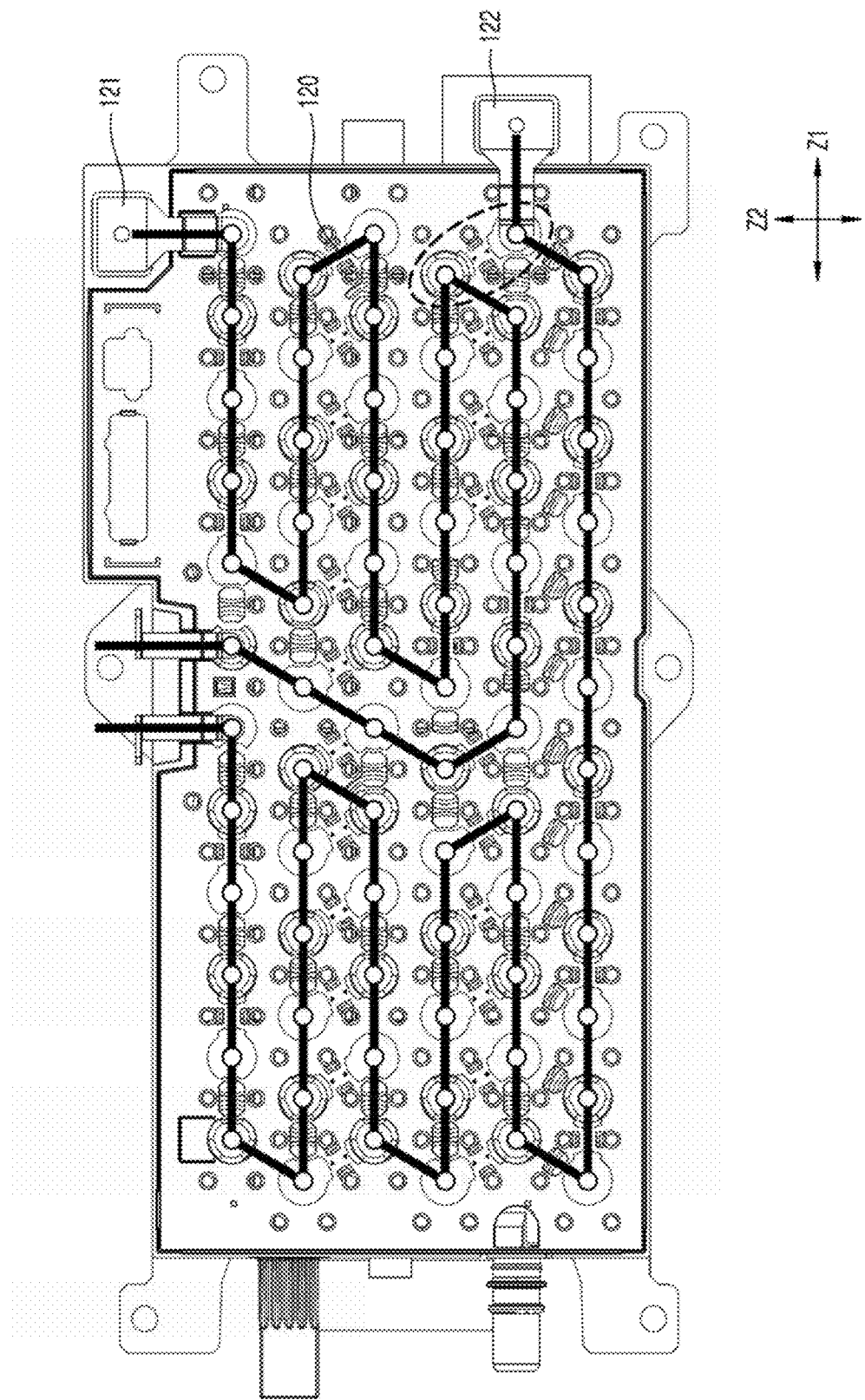
FIGS. 6A to 6C are views of electrical connections according to a comparative example.
Figure 6B:
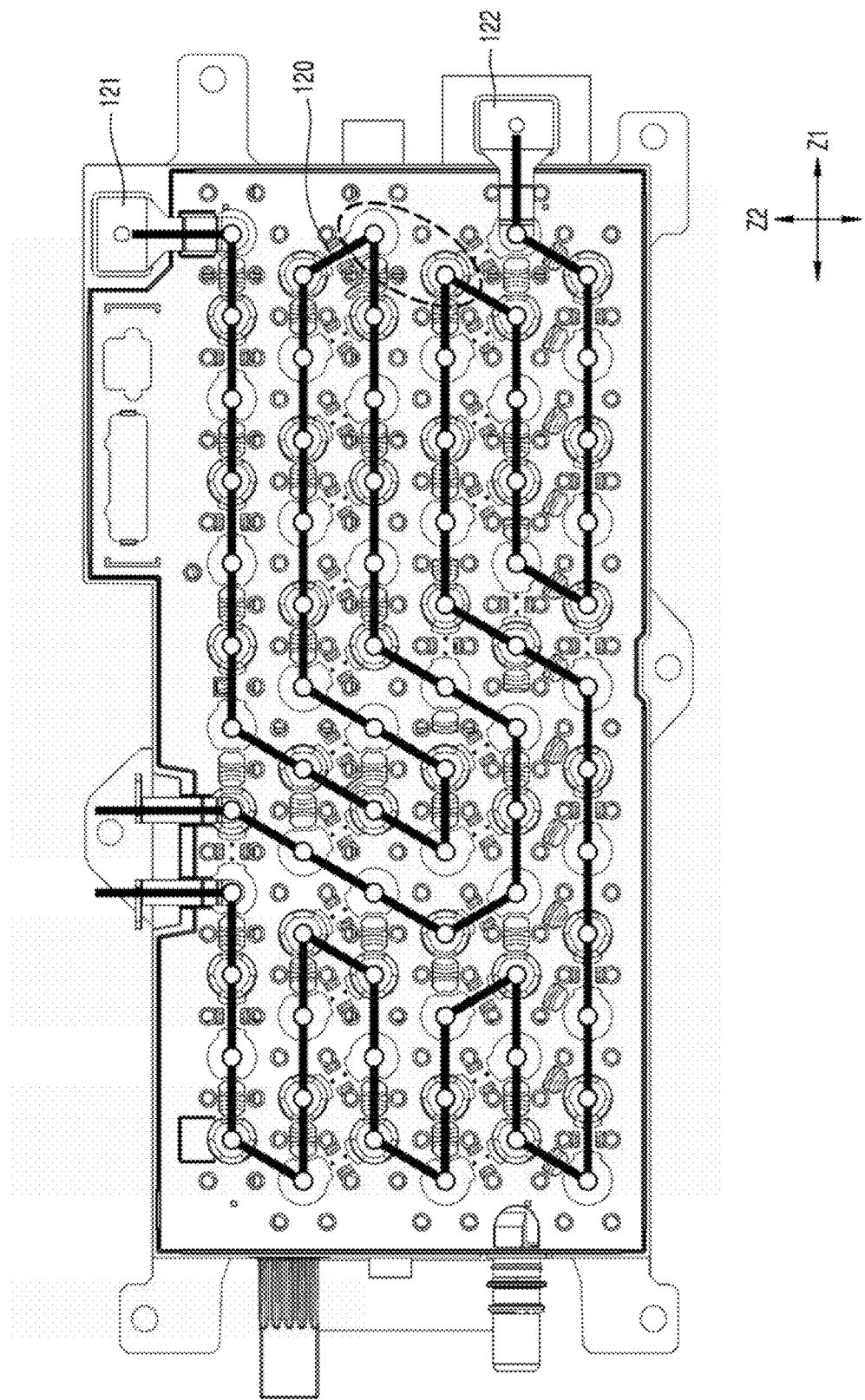
Figure 6C:
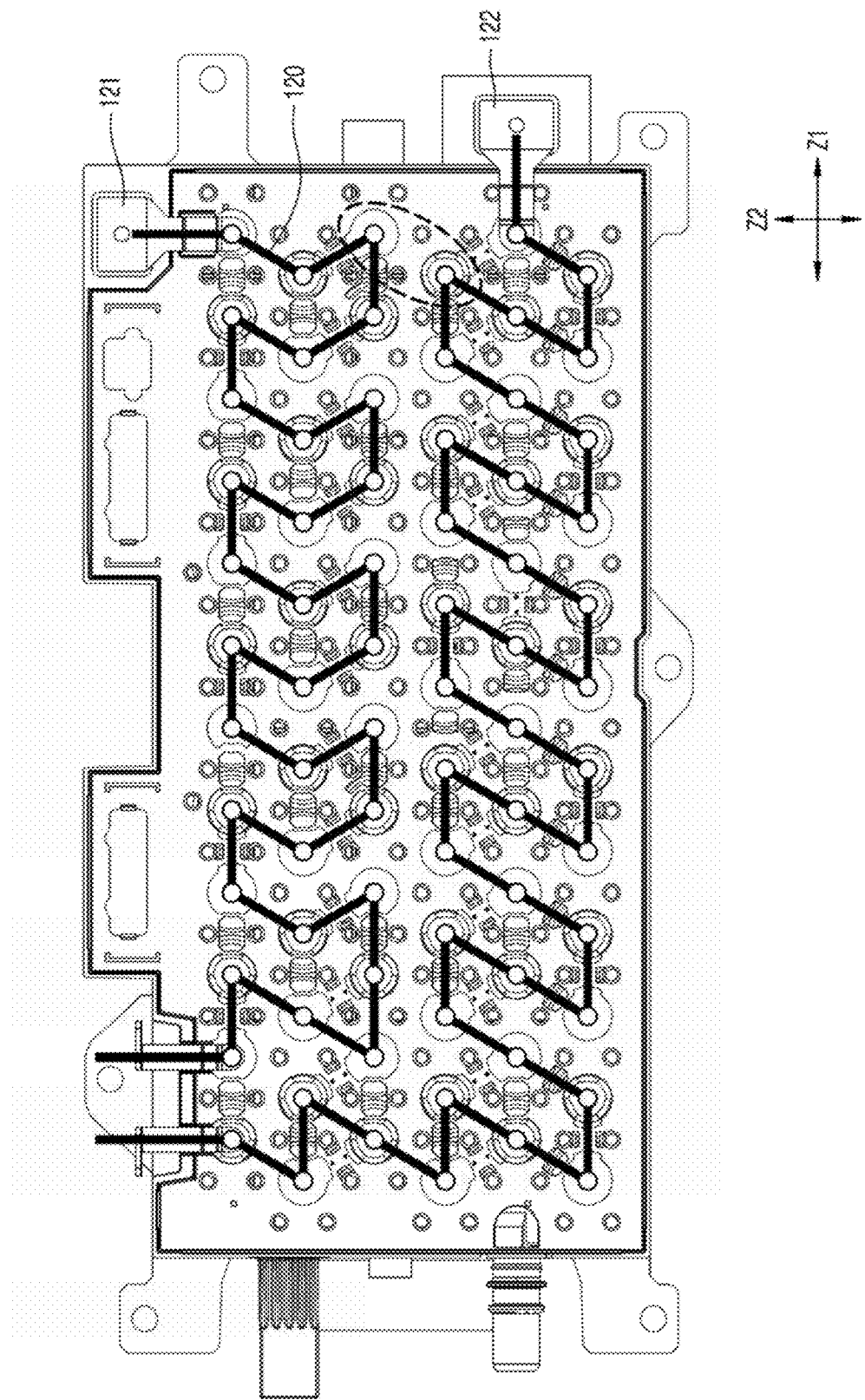
Figure 7:
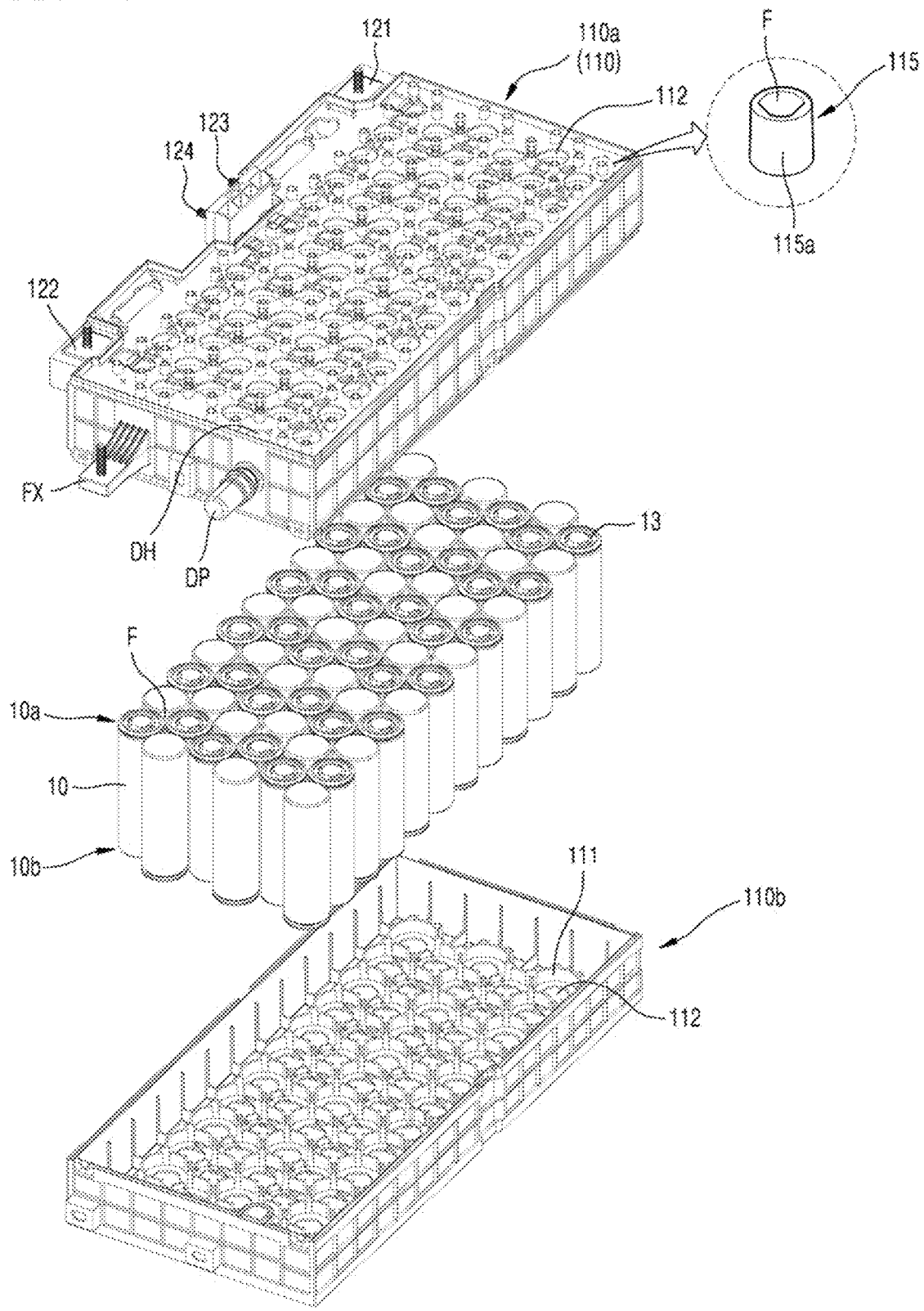
FIG. 7 is an exploded perspective view of a structure of a cell holder in which battery cells are assembled.
Figure 8:
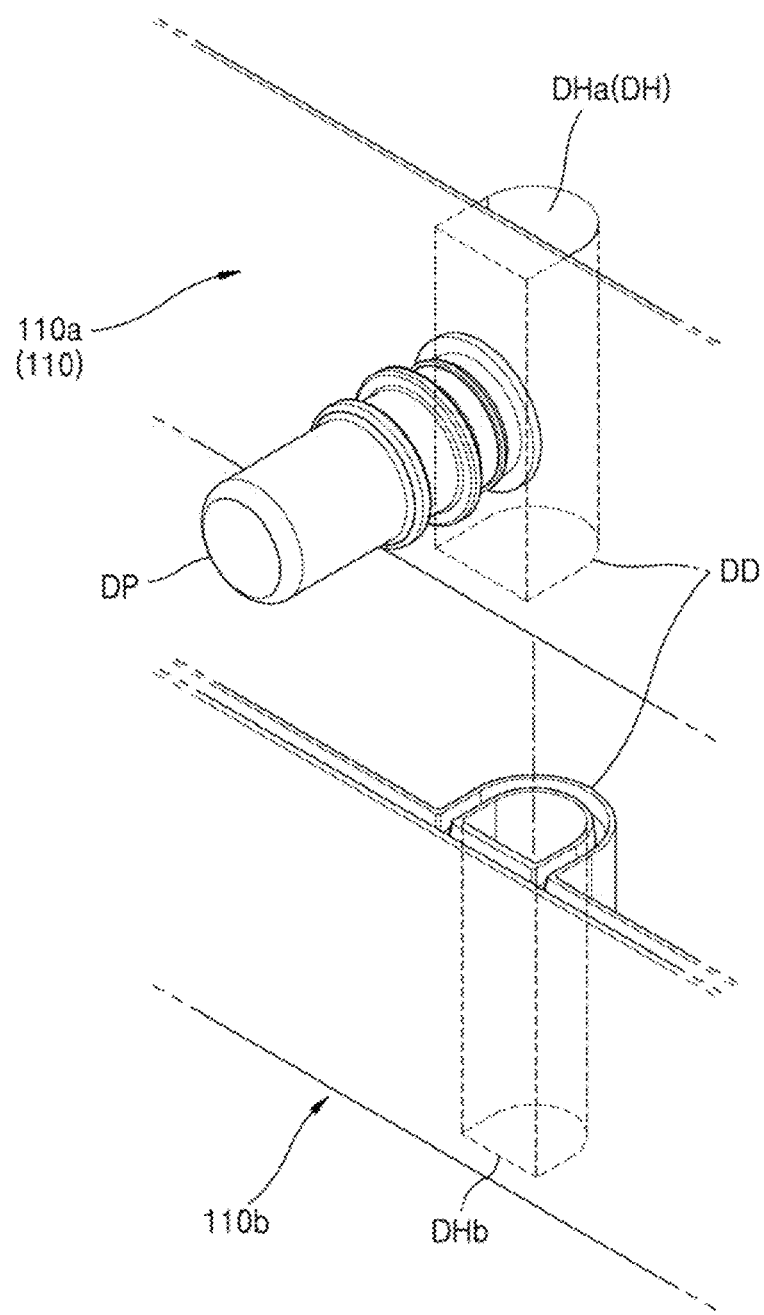
FIG. 8 is an exploded perspective view of an exhaust hole and an exhaust pipe of FIG. 7.
Figure 9:
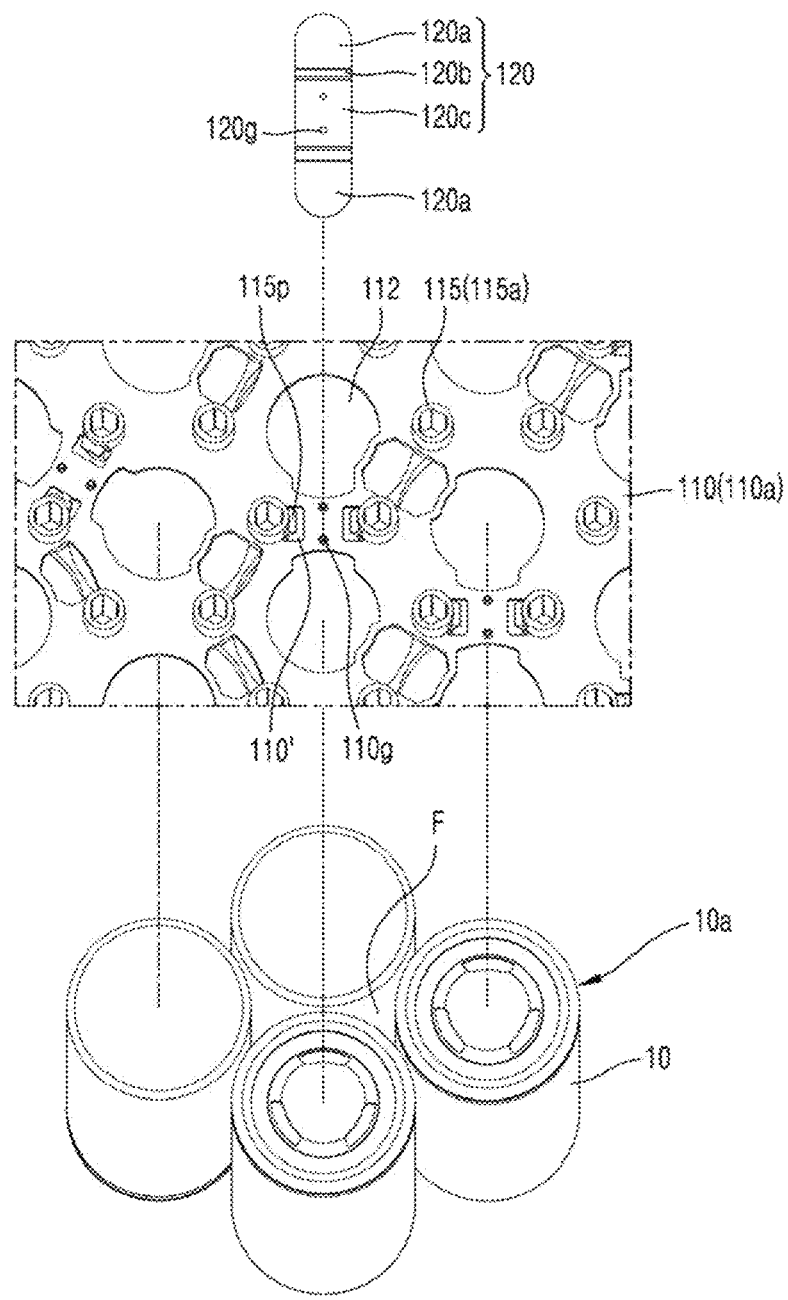
FIG. 9 is a view of assembly of a bus bar and a cell holder.
Figure 10:
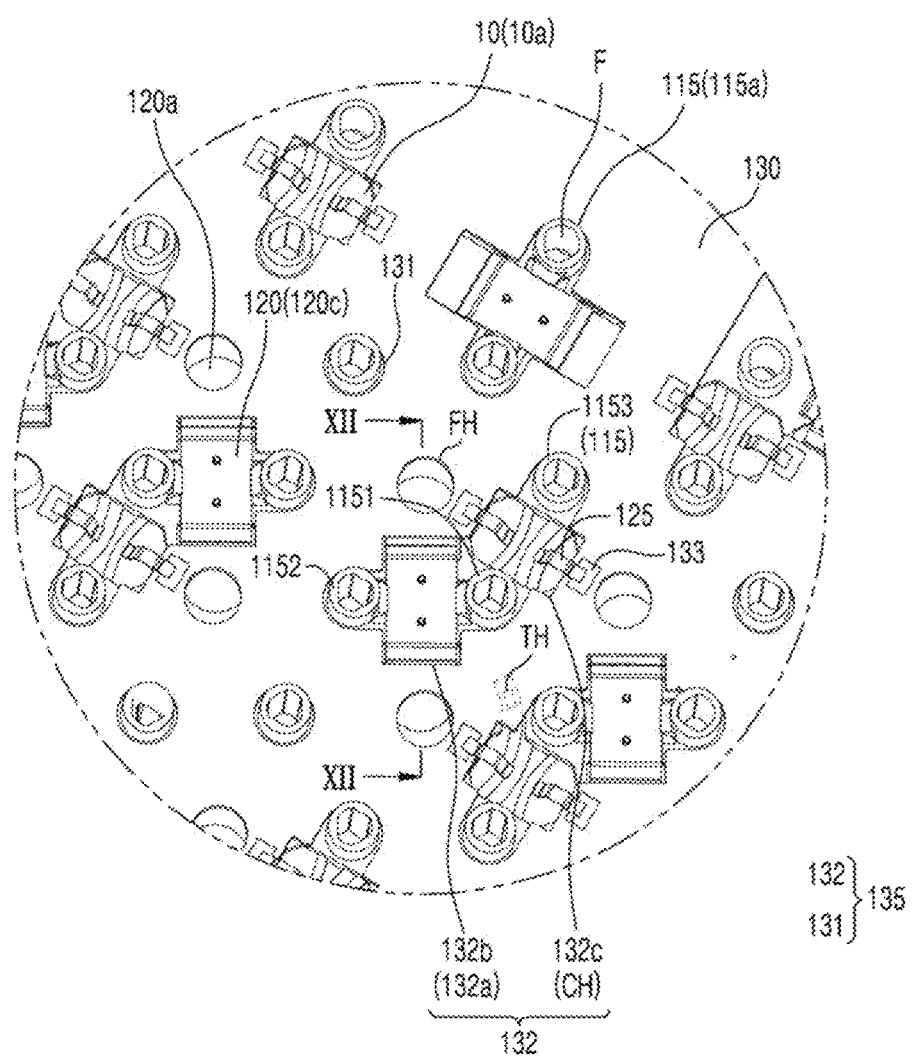
FIG. 10 is a view of a structure of a circuit board illustrated in FIG. 1.
Figure 11:
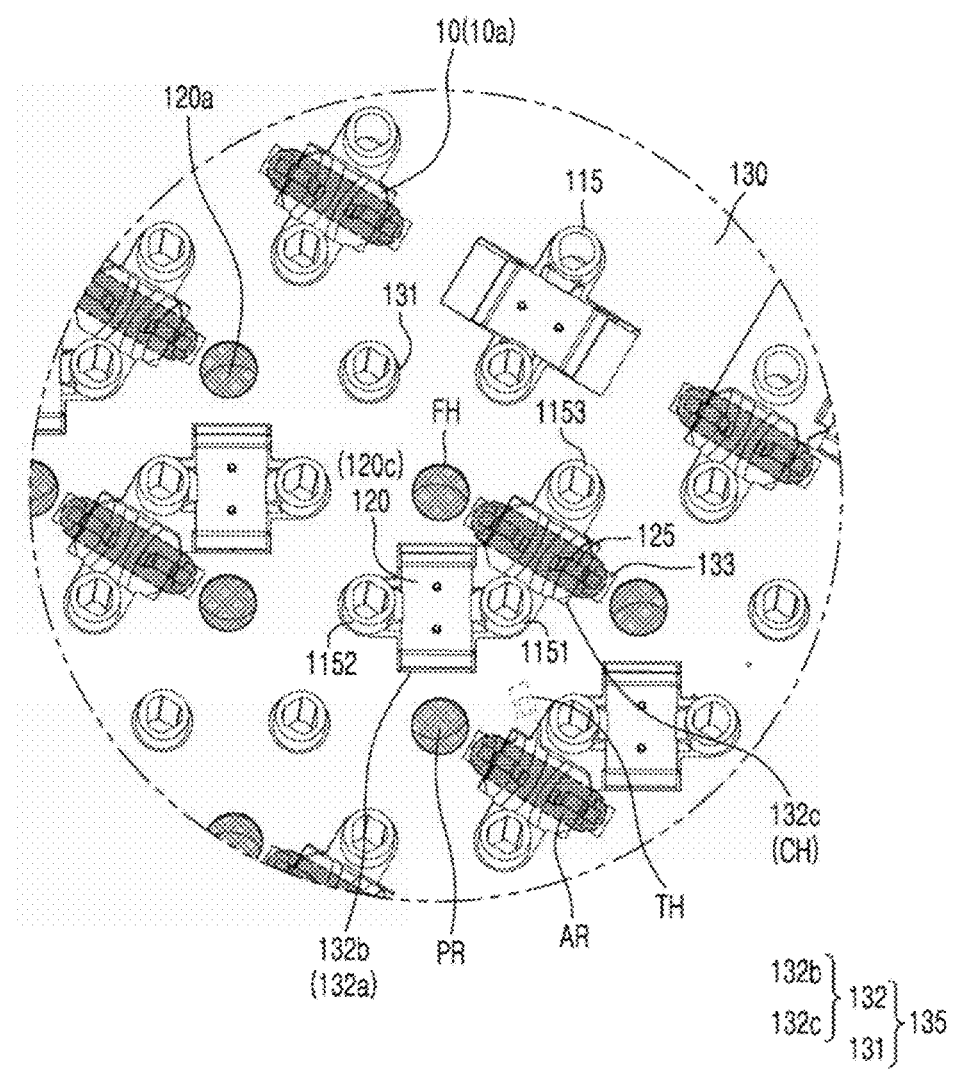
FIG. 11 is a view of a potting resin and an adhesive resin respectively formed in a filling hole and a coupling opening region of FIG. 10.
Figure 12:
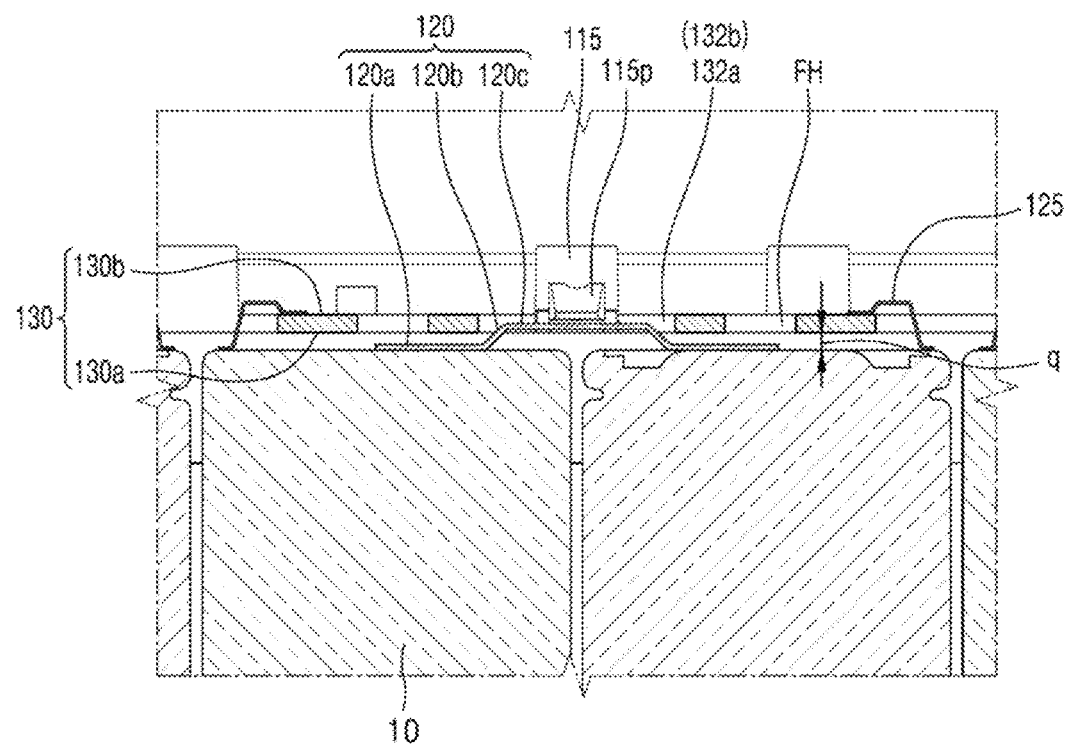
FIG. 12 is a cross-sectional view taken along line XII-XII of FIG. 10.
Figure 13:
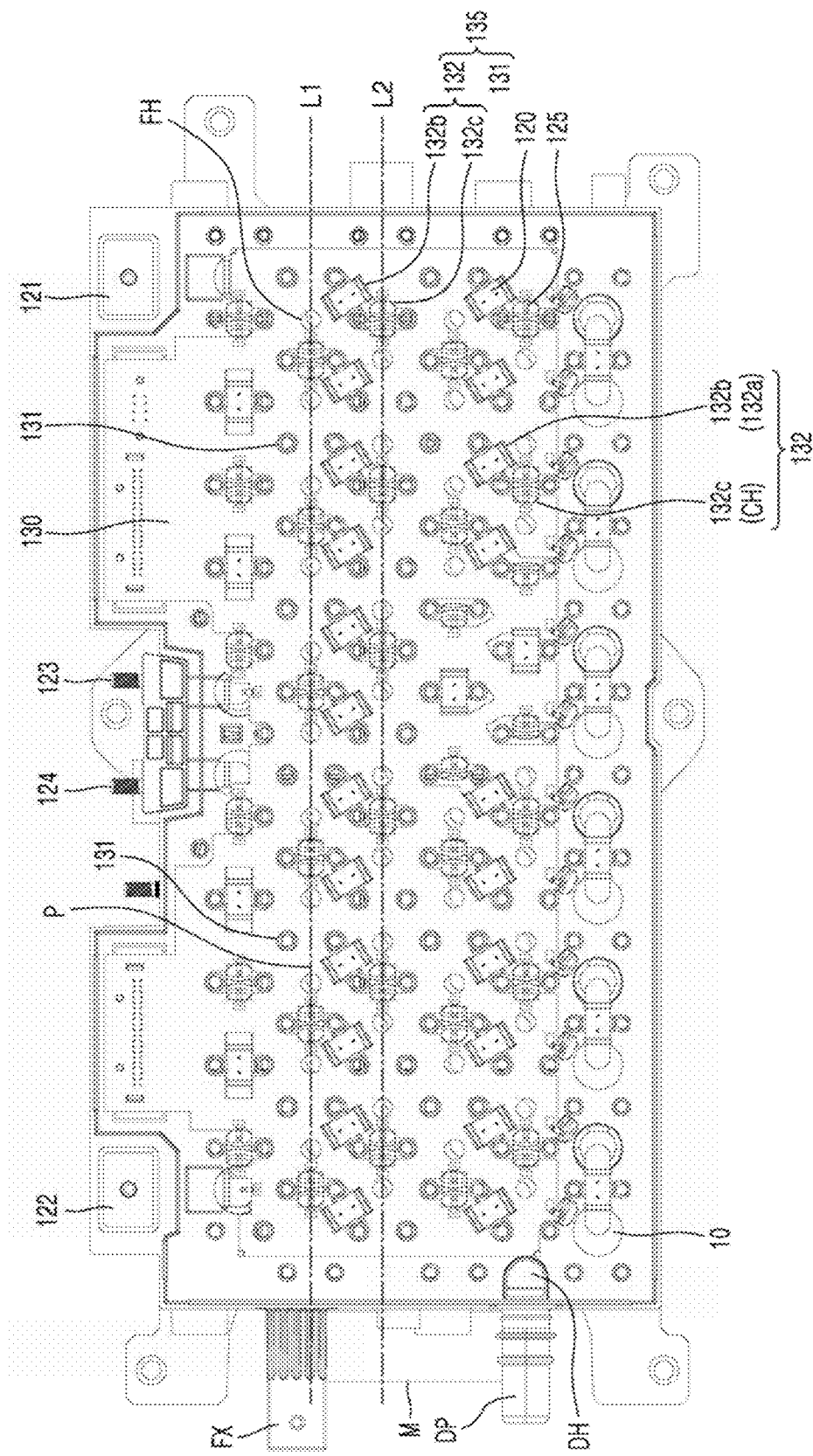
FIG. 13 is a view of first and second opening regions of FIG. 10.
Figure 14:
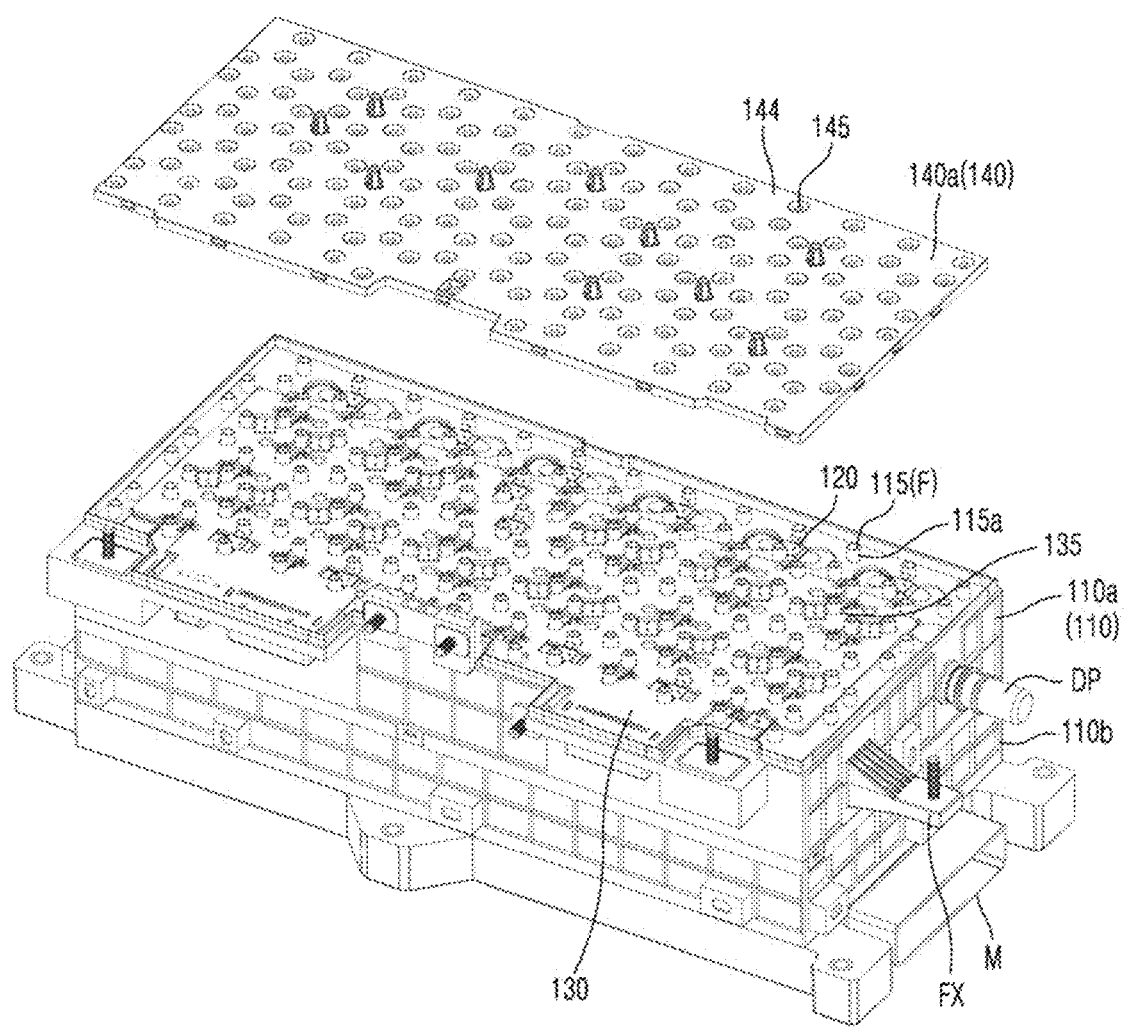
FIGS. 14 and 15 illustrate a separation member of FIG. 1 showing opposite surfaces of upper and lower separation members, respectively.
Figure 15:
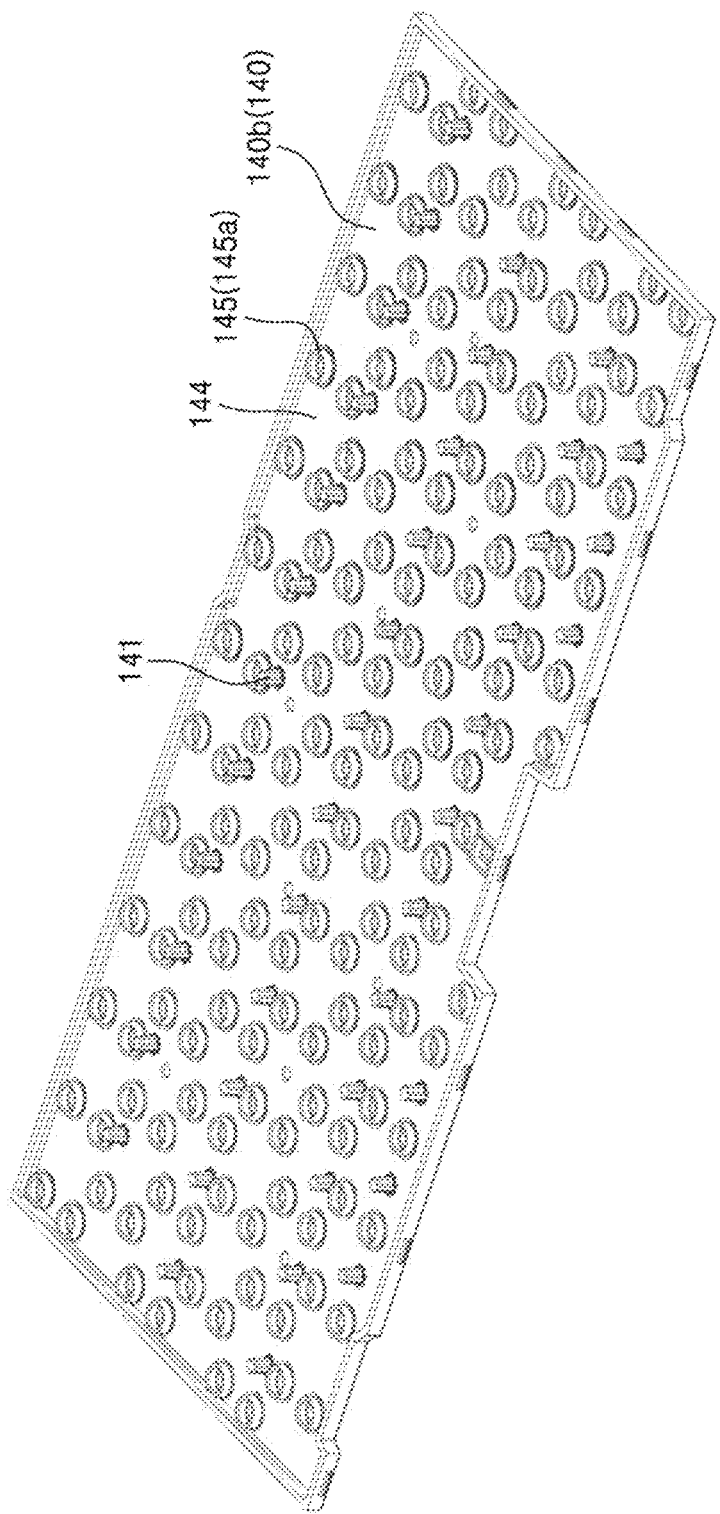
Figure 16:
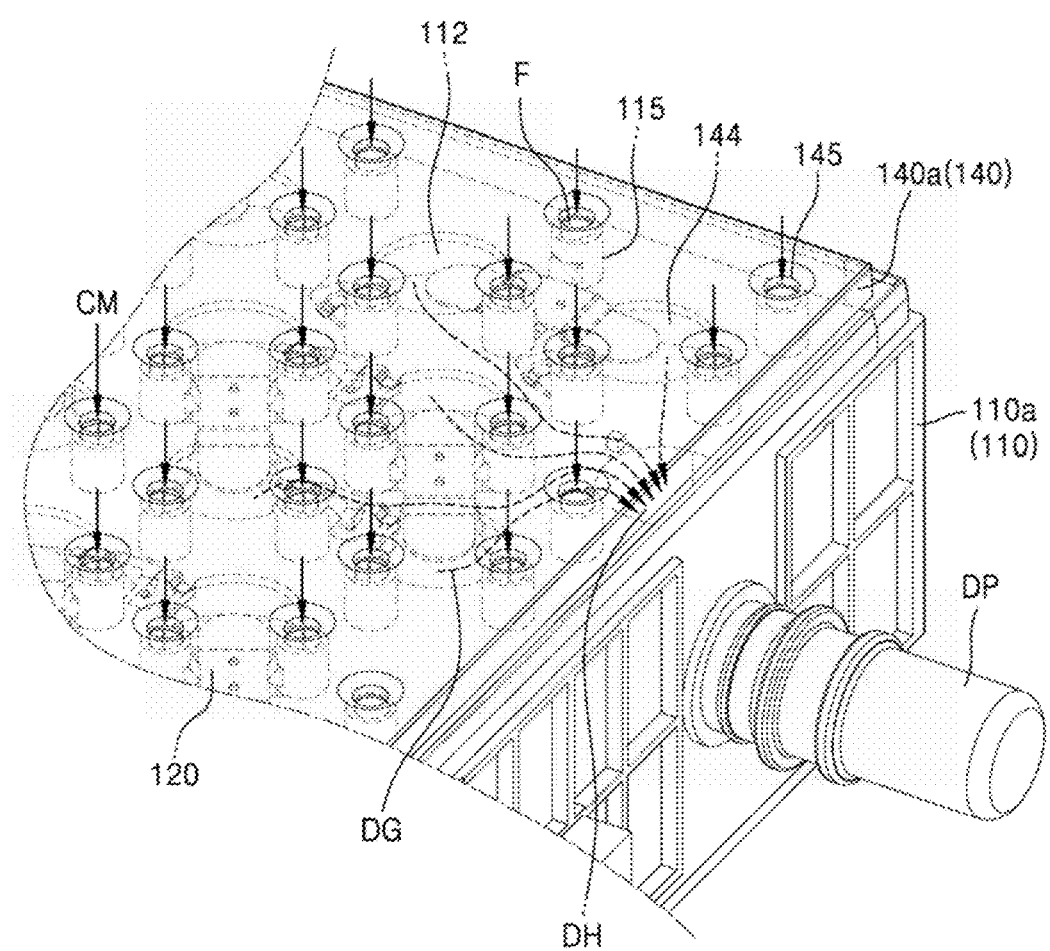
FIG. 16 is a view of a spatial separation of a cooling medium and an exhaust path of a cooling flow path, which is made by the separation member.
Figure 17:
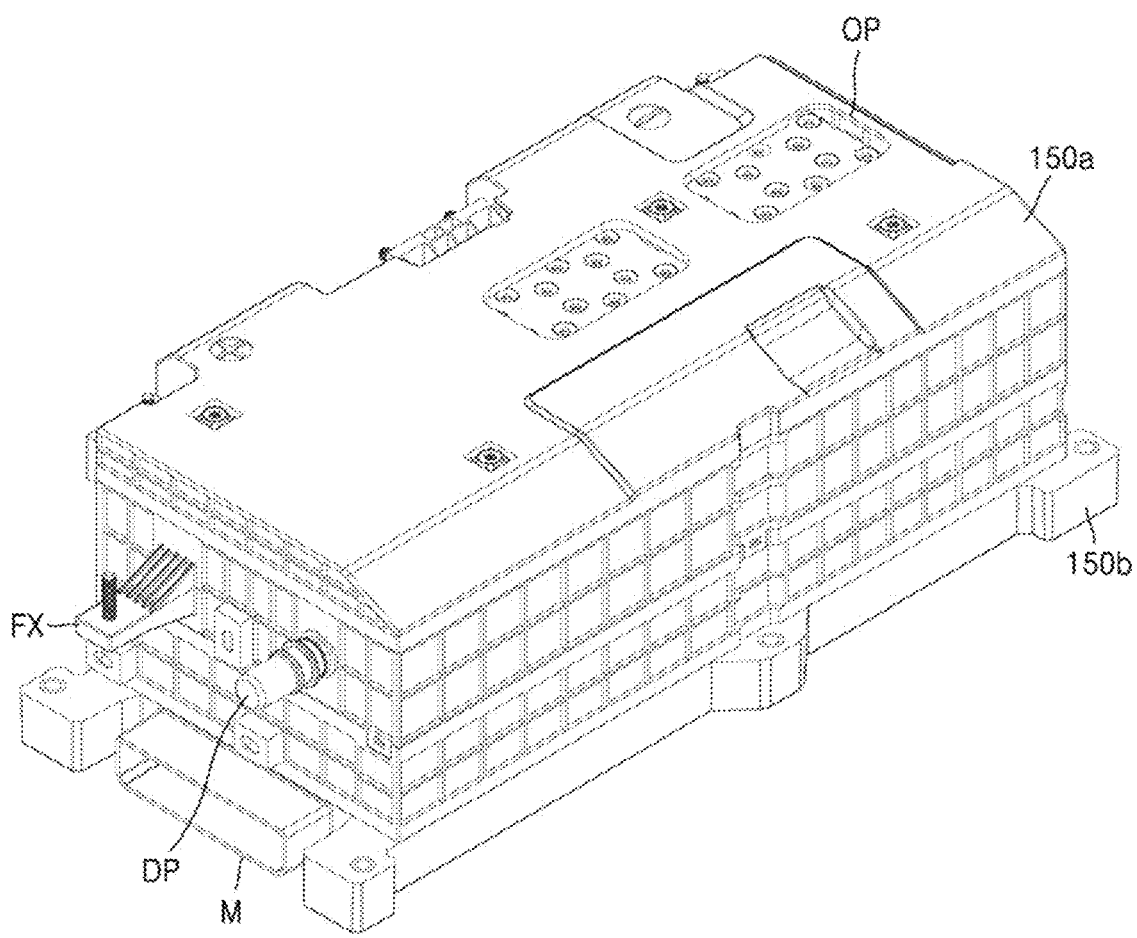
FIG. 17 is a perspective view of an upper duct and a lower duct.

FIG. 1 is an exploded perspective view of a battery pack according to an embodiment; FIGS. 2 and 3 illustrate perspective views of battery cells of FIG. 1; FIG. 4 is a view of the battery cell of FIG. 3 and showing cooling flow paths; FIG. 5 is a view of an arrangement of multiple bus bars or an electrical connection of battery cells in which multiple bus bars are arranged; FIGS. 6A to 6C are views schematically showing electrical connections according to a comparative example; FIG. 7 is an exploded perspective view of a structure of a cell holder in which battery cells are assembled; FIG. 8 is an exploded perspective view of an exhaust hole and an exhaust pipe illustrated in FIG. 7; FIG. 9 is a view of assembly of a bus bar and a cell holder; FIG. 10 is a view of a structure of a circuit board of FIG. 1; FIG. 11 is a view of a potting resin and an adhesive resin respectively formed in a filling hole and a coupling opening region of FIG. 10; FIG. 12 is a cross-sectional view taken along line XII-XII of FIG. 10; FIG. 13 is a view of first and second opening regions of FIG. 10; FIGS. 14 and 15 illustrate a separation member of FIG. 1 showing opposite surfaces of upper and lower separation members, respectively; FIG. 16 is a view of a spatial separation of a cooling medium and an exhaust path of a cooling flow path, which is made by the separation member; and FIG. 17 is a perspective view of an upper duct and a lower duct.

Referring to FIGS. 4 and 5, a battery pack according to an embodiment may include battery cells 10 of one group (e.g., a first group of battery cells 10) surrounded or bounded by an imaginary rectangular envelope S1 and S2 including a pair of long sides S1 and a pair of short sides S2 extending to linearly surround an outer periphery of the battery cells 10 of one group across an outer circumference of the battery cells 10 of one group forming the battery pack. Bus bars 120 of one group (e.g., a first group of bus bars 120) that electrically connect the battery cells 10 of one group to each other and may be arranged to electrically connect at least some of the battery cells 10 of one group and may be arranged in a transverse direction (e.g., approximately a short side direction Z2 that is different from a long side direction Z1 of the envelope S1 and S2), e.g., the bus bars may extend in a zig-zag shape.

Hereinafter, a battery pack according to an embodiment will be described more specifically.

Referring to FIGS. 2 to 5, the battery cells 10 may each include an upper end portion 10a and a lower end portion 10b in a height direction and may be a circular battery cell 10 having an outer circumferential surface 10c of a cylindrical shape between the upper end portion 10a and the lower end portion 10b. First and second electrodes 11 and 12 having different polarities may be respectively on the upper end portion 10a and the lower end portion 10b of the battery cell 10. In an implementation, the first and second electrodes 11 and 12 of the battery cell 10 may respectively correspond to a first polarity (e.g., cathode) and a second polarity (e.g., anode) of the battery cell 10 which are opposite to each other. In an implementation, one of the upper end portion 10a and the lower end portion 10b of the battery cell 10, e.g., the lower end portion 10b, may form the first electrode 11 as a whole, and the other, e.g., the upper end portion 10a, may have a central portion that is the second electrode 12 and a rim portion that is the first electrode 11. In an implementation, in the battery cell 10 illustrated in FIG. 3, the whole lower end portion 10b and the rim portion of the upper end portion 10a may be covered with a can N integrally extending so that the whole lower end portion 10b and the rim portion of the upper end portion 10a form the first electrode 11 to have the same polarity, and the central portion of the upper end portion 10a corresponding to a cap assembly E electrically insulated from the can N forming the first electrode 11 may form the second electrode 12 having a different polarity from the first electrode 11.

In an implementation, a circuit board 130 extending across the multiple battery cells 10 may have a coupling hole CH (see FIG. 1) exposing rim portions of the upper end portions 10a of a pair of adjacent battery cells 10 therein, and the rim portions of the upper end portions 10a of the battery cells 10 exposed through the coupling hole CH may form the first electrodes 11 of the same polarity. In an implementation, the adjacent battery cells 10 exposed through the same coupling hole CH may be arranged in a vertically inverted pattern in a height direction of the battery cells 10, and the rim portions of the upper end portions 10a of the battery cells 10 may form the first electrodes 11 of the same polarity, regardless of the vertical arrangement of the battery cells 10. As can be seen in FIG. 3, the can N forming the first electrode 11 may extend from the rim portion of the upper end portion 10a to the lower end portion 10b as a whole, and thereby, all of the rim portion of the upper end portion 10a of the battery cell 10 and the rim portion of the lower end portion 10b of the battery cell 10 have the first electrodes 11 of the same polarity regardless of a vertical arrangement of the battery cell 10.

As will be described in greater detail below, upper end portions 10a of the adjacent battery cells 10 may be electrically connected to each other by a bus bar 120, and lower end portions 10b of the adjacent battery cells 10 may be electrically connected to each other by another bus bar 120. In an implementation, the bus bar 120 may connect the central portions of the upper end portions 10a of the adjacent battery cells 10, and the bus bar 120 may connect the central portions of the lower end portions 10b of the adjacent battery cells 10. As illustrated in FIG. 3, the central portion of the upper end portion 10a may be the cap assembly E forming the second electrode 12, and the central portion of the lower end portion 10b may be formed as the can N forming the first electrode 11, and the central portion of the upper end portion 10a of the battery cell 10 or the central portion of the lower end portion 10b of the battery cell 10 may form the first electrode 11 or the second electrode 12. Throughout the present specification, that the upper end portion 10a and the lower end portion 10b of the battery cell 10 respectively have the first electrode 11 and the second electrode 12 or respectively form the second electrode 12 and the first electrode 11 may indicate that the central portions of the upper end portion 10a and the lower end portion 10b of the battery cell 10 respectively have the first electrode 11 and the second electrode 12 or respectively have the second electrode 12 and the first electrode 11. In addition, throughout the present specification, connecting the upper end portions 10a to the lower end portions 10b of the adjacent battery cells 10 through that the bus bars 120 may indicate connecting the central portions of the upper end portions 10a to each other through the bus bars 120 and connecting the central portions of the lower end portions 10b to each other through the bus bars 120.

Throughout the present specification, the upper end portion 10a and the lower end portion 10b of the battery cell 10 may be divided according to positions rather than the first and second electrodes 11 and 12 and may respectively indicate an end portion formed at an upper position and an end portion formed at a lower position in a height direction. In an implementation, the upper end portions 10a of the adjacent battery cells 10 may form the first electrode 11 or the second electrode 12 having the same polarity or may also form the first and second electrodes 11 and 12 having different polarities depending on the specific arrangement of the battery cells 10.

Referring to FIG. 2, in one embodiment, the adjacent battery cells 10 may be arranged in an inverted pattern in a height direction, and accordingly, the upper end portions 10a of the adjacent battery cells 10 may form the first and second electrodes 11 and 12 having different polarities, and the lower end portions 10b of the adjacent battery cells 10 may also form the first and second electrodes 11 and 12 having different polarities.

The battery cells 10 may be electrically connected to other adjacent battery cells 10, and the first and second electrodes 11 and 12 of the battery cells 10 may be connected in series to electrodes having different polarities while the battery cells 10 adjacent in an electrical connection direction are arranged in an inverted pattern in a height direction. In an implementation, each of a group of the battery cells 10 forming a battery pack may be connected in series with the adjacent battery cell 10, and a battery pack according to an embodiment may not include a parallel connection between the adjacent battery cells 10. Accordingly, in one embodiment, the adjacent battery cells 10 in an electrical connection direction may be arranged in a vertically inverted pattern, and a series connection between the first and second electrodes 11 and 12 having different polarities may be formed by connecting the upper end portions 10a to each other or connecting the lower end portions 10b to each other. In an implementation, along the electrical connection direction, the battery cells 10 may alternate in an up or down direction, e.g., in which the first electrode 11 of one battery cell 10 faces upwardly and the first electrode of the next battery cell 10 faces downwardly.

Throughout this specification, the electrical connection direction of the battery cells 10 indicates a direction in which the adjacent battery cells 10 are electrically connected to each other and may include different directions interconnected through an arrangement of multiple bus bars 120 rather than indicating a certain one direction (e.g., would not indicate a simple linear direction).

In an implementation, the electrical connection direction of the battery cell 10 may be formed in a zig-zag shape. As will be described in greater detail below, the battery cell 10 may a circular battery cell, and multiple battery cells 10 may be densely arranged by arranging the battery cells 10 at alternate positions so as to be between adjacent battery cells 10 (e.g., the battery cells 10 may be in an offset arrangement such that the battery cells may be tightly packed). As such, the multiple battery cells 10 arranged at alternate positions may be electrically connected to each other by the multiple bus bars 120 arranged in a zig-zag shape, and the electrical connection direction of the zig-zag shape may be formed in a direction in which the multiple bus bars 120 are arranged.

Referring to FIG. 2, a group of the battery cells 10 forming a battery pack may be electrically connected to each other in the electrical connection direction in which the multiple bus bars 120 are arranged, and the battery cell 10 forming one end in the electrical connection direction and the battery cell 10 forming the other end may respectively correspond to a low-potential battery cell 10 (having the lowest potential) and a high-potential battery cell 10 (having the highest potential) among a group of battery cells 10. In an implementation, first and second output terminals 121 and 122 may be respectively connected to the low-potential battery cell 10 and the high-potential battery cell 10.

The first and second output terminals 121 and 122 may mediate an electrical connection between a group of the battery cells 10 electrically connected to each other and an external device, and a group of the battery cells 10 may supply a discharge power to an external load through the first and second output terminals 121 and 122 or may receive a charging power from an external charger through the first and second output terminals 121 and 122.

First and second fuse terminals 123 and 124 may be between the first and second output terminals 121 and 122 to be connected to a fuse box forming a charge/discharge path by being between the first and second output terminals 121 and 122. The fuse box may form a charge/discharge path between the first and second output terminals 121 and 122, and the charge/discharge path of a group of the battery cells 10 may pass through a fuse box (through the first and second fuse terminals 123 and 124 connected to the fuse box. A fuse for blocking an overcurrent may be installed in the fuse box and may block the charge/discharge path in response to the overcurrent.

In an implementation, the first and second fuse terminals 123 and 124 may be connected to the battery cell 10 between the low-potential battery cell 10 at one end and the high-potential battery cell 10 at the other end in an electrical connection direction of the battery cells 10 in which the multiple bus bars 120 are arranged, and may be formed in pairs to be respectively connected to a pair of the battery cells 10 electrically connected to each other through a fuse box connected to the first and second fuse terminals 123 and 124. In an implementation, the first and second fuse terminals 123 and 124 may respectively correspond to fuse terminals close to the first and second output terminals 121 and 122 in an electrical connection direction of the battery cells 10 in which multiple bus bars 120 are arranged.

Cooling flow paths F may be between the adjacent battery cells 10. A cooling medium flowing through the cooling flow paths F may be in contact with the battery cells 10 to cool the battery cells 10. The cooling flow path F may penetrate a space between the adjacent battery cells 10 in a height direction of the battery cell 10 and extend to the outside of the battery cell 10, and the cooling flow path F formed to penetrate almost the whole battery pack may be in fluid communication with the outside of the battery pack through an inlet and an outlet of the cooling flow path F. In this case, the cooling flow path F may extend across the battery pack to penetrate almost the whole battery pack in the height direction of the battery cell 10. The cooling flow path F will be described below in greater detail.

Referring to FIG. 3, a vent portion 13 may be formed at at least one end portion of the upper end portion 10a and the lower end portion 10b of the battery cell 10. When the end portion of the battery cell 10 in which the vent portion 13 is formed among the upper end portion 10a and the lower end portion 10b of the battery cell 10 is referred to as one end portion of the battery cell 10, the vent portion 13 may be formed along a rim of the one end portion of the battery cell 10. In an implementation, the vent portion 13 may be formed along a rim of the second electrode 12 formed at a central position of the one end portion of the battery cell 10, and may be formed along a rim of the one end portion of the battery cell 10.

In an implementation, the vent portion 13 may include multiple vent portions 13 spaced apart from each other along a rim in one end portion of the battery cell 10. The vent portion 13 may be for relieving an internal pressure of the battery cell 10, e.g., the vent portion 13 may correspond to a portion formed with a relatively weak strength in one end portion of the battery cell 10. When the internal pressure of the battery cell 10 increases above a preset critical pressure (corresponding to a breakage pressure of the vent portion 13), the vent portion 13 may be broken to relieve the internal pressure.

Referring to FIG. 1, exhaust gas emitted through the vent portion 13 according to the internal pressure of the battery cell 10 may be emitted to the outside of a battery pack along an exhaust path of which one side is closed by a block region 144 of the separation member 140. In an implementation, the block region 144 corresponding to the vent portion 13 of the battery cell 10 may be formed in the separation member 140, and the exhaust gas exhausted through the vent portion 13 may be emitted to the outside of a battery pack through an exhaust path formed between the block region 144 of the separation member 140 and the battery cell 10. The separation member 140 and the exhaust path will be described in greater detail below.

Hereinafter, an arrangement of the battery cells 10 and a position of the cooling flow path F between the battery cells 10 according to an embodiment will be described with reference to FIG. 4.

The cooling flow path F may be between the adjacent battery cells 10. In an implementation, the battery cell 10 may be a circular battery cell, and the battery cells 10 may be arranged at alternate positions to be between the adjacent battery cells 10, and thereby, the multiple battery cells 10 may be densely arranged, and by densely arranging the battery cells 10 by using spaces between the adjacent battery cells 10, an invalid or unused space may be reduced and a battery pack having a high energy density per area may be provided.

In an implementation, the battery cells 10 may be arranged in or along a column direction Z1 of the battery cells 10, and the battery cells 10 in adjacent rows may be arranged at alternate positions so that the battery cells 10 in adjacent rows are therebetween. In an implementation, the column direction Z1 of the battery cells 10 may indicate one direction in which the battery cells 10 are arranged when the battery cells 10 are arranged linearly in one direction. The column direction Z1 of the battery cells 10 may be different from a direction in which the multiple battery cells 10 are electrically connected to each other, e.g., an electrical connection direction of the battery cells 10, and the column direction Z1 of the battery cells 10 may indicate one direction in which the battery cells 10 are arranged without considering an electrical connection state of the battery cells 10.

In an implementation, the battery cells 10 may be linearly arranged in the column direction Z1 and may be arranged in a zig-zag shape in a transverse direction (e.g., Z2) crossing the column direction Z1. In an implementation, an arrangement of the battery cells 10 of which outer circumferential surfaces are arranged adjacent may be formed linearly in the column direction Z1 and may be formed in a zig-zag shape in a transverse direction crossing the column direction Z1. In this case, the arrangement of the battery cells 10 of which outer circumferential surfaces are arranged adjacent may indicate an arrangement of the battery cells 10 of which outer circumferential surfaces are arranged close to each other and may indicate, e.g., an arrangement of the battery cells 10 of which outer circumferential surfaces are arranged close to each other so that an interval between the outer circumferential surfaces of the adjacent battery cells 10 becomes a smallest interval SG. In an implementation, the smallest interval SG may be set for the purpose of ensuring electrical insulation between the adjacent battery cells 10 and ensuring sufficient heat dissipation, e.g., the smallest interval SG may be set to approximately 1 mm.

In an implementation, a group of battery cells 10 forming a battery pack may be surrounded or bounded by (e.g., contained entirely within) a rectangular envelope (e.g., imaginary rectangular envelope) S1 and S2 including a pair of long sides S1 and a pair of short sides S2 extending to linearly surround an outer periphery of the group of battery cells 10 across an outer circumference of the group of battery cells 10, the column direction Z1 in which the battery cells 10 are arranged linearly may correspond to a direction parallel to the long side S1 of the envelope S1 and S2, and a transverse direction in which the battery cells 10 are arranged in a zig-zag shape may correspond to a direction close to the short side S2 of the envelope S1 and S2.

Referring to FIG. 4, the battery cells 10 in first and second rows R1 and R2 may be densely arranged toward each other so that the battery cells 10 in the first row R1 are (e.g., at least partially) between the battery cells 10 in the second row R2, and similarly, the battery cells 10 in the second row R2 and a third row R3 may be densely arranged toward each other so that the battery cells 10 in the second row R2 are (e.g., at least partially) between the battery cells 10 in the third row R3.

Any one of the battery cells 10 may be between the adjacent battery cells 10 and the three battery cells 10 may be arranged so that outer circumferences thereof are adjacent, and in this case, the cooling flow path F may be between the three battery cells 10 of which circumferences are adjacent. The cooling flow path F may be in an extra region, which is not occupied by the battery cells 10, between the three battery cells 10 of which outer circumferences are adjacent, e.g., a valley region therebetween.

In an implementation, the cooling flow path F may be between the battery cells 10 in the first and second rows R1 and R2 adjacent to each other, and one cooling flow path F may be between two battery cells 10 in the first row R1 and one battery cell 10 in the second row R2, and the one cooling flow path F may also be between two battery cells 10 in the second row R2 and one battery cell 10 in the first row R1. Similarly, the cooling flow path F may be between the battery cells 10 in the second and third rows R2 and R3 adjacent to each other, and one cooling flow path F may be between two battery cells 10 in the second row R2 and one battery cell 10 in the third row R3, and the one cooling flow path F may also be between two battery cells 10 in the third row R3 and one battery cell 10 in the second row R2.

Referring to FIG. 4, six cooling flow paths F may be in the outer circumferential direction of one battery cell 10 included in the second row R2. In an implementation, one battery cell 10 in the second row R2 may form many valley regions between six battery cells 10 (battery cells 10 in the first to third columns R1, R2, and R3) in the outer circumferential direction, and a total of six valley regions may be formed by sequentially forming valley regions between two battery cells 10 in an outer circumferential direction, and a total of six cooling flow paths F may be formed by forming the cooling flow paths F for each valley region.

Hereinafter, an arrangement of the multiple bus bars 120 or an electrical connection of the battery cells 10 in which the multiple bus bars 120 are arranged will be described with reference to FIGS. 4 and 5. Referring to FIG. 5, an upper bus bar 120a (see FIG. 1) and a lower bus bar 120b (see FIG. 1) are illustrated together, and all electrical connections of the upper bus bar 120a and the lower bus bar 120b are illustrated, for the sake of easy understanding. Hereinafter, the upper bus bar 120a and the lower bus bar 120b will be collectively referred to as the bus bar 120 without distinction. However, in one embodiment, an electrical connection illustrated in FIG. 5 may be implemented through the upper bus bar 120a and the lower bus bar 120b alternately arranged above and below the cell holder 110. Meanwhile, numbers illustrated in FIG. 5 may indicate an order of the battery cells 10 counted in an electrical connection direction.

Referring to FIGS. 4 and 5, the multiple bus bars 120 electrically connecting adjacent battery cells 10 to each other may be arranged in a zig-zag shape. In an implementation, the battery cells 10 may circular battery cells, and the battery cells 10 may be arranged at alternate positions so as to be between adjacent battery cells 10, and thus, the multiple battery cells 10 may be densely arranged.

In an implementation, assuming that a group of battery cells 10 forming a battery pack is surrounded by the imaginary rectangular envelope S1 and S2 including a pair of long sides S1 and a pair of short sides S2 extending to linearly surround an outer periphery of the group of battery cells 10 across an outer circumference of the group of battery cells 10, the group of battery cells 10 forming a battery pack may include an arrangement in the column direction Z1 linearly extending in parallel with a long side direction Z1 and an arrangement in a transverse direction extending in a zig-zag shape approximately in a short side direction Z2. In an implementation, the transverse direction extending of the zig-zag shape may correspond to a direction closer to the short side direction Z2 than to the long side direction Z1 of the group of battery cells 10 and may correspond to a direction close to the short side direction Z2 shorter than the long side S1. In this case, the multiple bus bars 120 electrically connecting the adjacent battery cells 10 may be arranged in a zig-zag shape while connecting the adjacent battery cells 10 along the arrangement of the battery cells 10 in the transverse direction extending in a zig-zag shape.

In an implementation, the arrangement of the multiple bus bars 120 or the electrical connection direction of the battery cells 10 in which the multiple bus bars 120 are arranged may not formed in the column direction Z1 parallel to the long side direction Z1, but rather may be formed in a transverse direction closer in direction to the short side direction Z2 (shorter than the long side S1), and thus, a potential (voltage) difference between the battery cells 10 of one array electrically connected to each other in the transverse direction Z2 and the battery cells 10 of an adjacent array electrically connected to each other in the transverse direction may be reduced, e.g., by reducing a potential difference between the battery cells 10 of an adjacent array in the column direction Z1, a risk of an electrical short-circuit between the adjacent battery cells 10 may be reduced, and safety of a battery pack may be increased. In an implementation, the battery cells 10 of the one array and the adjacent array may be electrically connected through an arrangement of the bus bars 120 extending in a transverse direction in a zig-zag shape, and the battery cells 10 of the one array and the adjacent array may be arranged adjacent in the column direction Z1 crossing the transverse direction. In this case, a greatest potential difference (highest voltage) between the battery cells 10 arranged adjacent in the column direction Z1, e.g., a greatest potential difference (highest voltage) between the battery cell 10 (seventh battery cell) included in the one array and the battery cell 10 ($18^{th}$ battery cell) included in an adjacent array may be calculated by multiplying the number of bus bars 120 electrically connecting the battery cells 10 (e.g., 11) and a full charging voltage (e.g., 4.2 V) of each of the battery cells 10. This may be because a difference may occur between the adjacent battery cells 10 connected by the bus bars 120 by a full charging voltage. In an implementation, the greatest potential difference (the highest voltage) between the adjacent battery cells 10 may be 46.2 V. As will be described below, a battery pack according to an embodiment may be formed as a 72-cell structure including 72 battery cells 10, and include a high-voltage deflection unit HVe for compatibility with a 64-cell structure including 64 battery cells 10, and in this case, a greatest potential difference (highest voltage) between the adjacent battery cells 10, e.g., a $19^{th}$ battery cell 10 and a $40^{th}$ battery cell 10 may be 88.2 V. Even in this case, when compared to that the greatest potential difference (highest voltage) between the adjacent battery cells 10 exceeds 200 V or approaches 200 V in the comparative examples illustrated in FIGS. 6A to 6C, it may be determined that safety of a battery pack is increased.

If the multiple bus bars 120 were to be arranged in the column direction Z1 rather than a transverse direction Z2, a relatively large number of battery cells 10 may be arranged, and a relatively large number of bus bars 120 may be arranged for the number of relatively large number of battery cells 10. Thus, the highest voltage between the adjacent battery cells 10 may increase by that amount, and a risk of an electrical short-circuit between the adjacent battery cells 10 may be increased.

Referring to FIG. 5, in one embodiment, a group of the bus bars 120 forming a battery pack may include the bus bars 120 extending in a zig-zag shape in the transverse direction, and the bus bar 120 in the column direction Z1, and an arrangement of the bus bars 120 or an electrical connection direction of the battery cells 10 in which the bus bars 120 are arranged may be considered as following or roughly extending along the transverse direction. In an implementation, whether the group of bus bars 120 forming the battery pack follows the transverse direction Z2 or the column direction Z1 may be determined through a relative comparison of the number of bus bars 120 in the transverse direction Z2 (e.g., a number of bus bars 120 having a long axis roughly aligned with the transverse direction Z2) and the number of bus bars 120 in the column direction Z1 (e.g., a number of bus bars 120 having a long axis roughly aligned with the column direction Z1). In an implementation, one bus bar 120 may be arranged in the column direction Z1 per five bus bars 120 approximately in the transverse direction Z2, and in this case, an arrangement of the bus bars 120 or an electrical connection direction of the battery cells 10 in which the bus bars 120 are arranged may be considered as following the transverse direction Z2, rather than the column direction Z1.

In an implementation, the arrangement of the bus bars 120 or the electrical connection direction of the battery cells 10 in which the bus bars 120 are arranged may be formed in a transverse direction Z2 and extending in a zig-zag shape. The arrangement of the bus bars 120 extending in the transverse direction Z2 may be repeated in the column direction Z1 by using the arrangement of the bus bars 120 extending in the transverse direction Z2 as a unit. In an implementation, the first and second output terminals 121 and 122 may be arranged or spaced apart in the column direction Z1, e.g., in or along the long side direction Z1 of the envelope S1 and S2. The first and second output terminals 121 and 122 may be arranged in or along the long side direction Z1 of the envelope S1 and S2 surrounding the group of battery cells 10, and thereby, an electrical connection in a transverse direction Z2 (e.g., closer in direction to to the short side direction Z2 of the envelope S1 and S2) may be formed, and accordingly, the greatest potential difference (highest voltage) between the adjacent battery cells 10 may be reduced.

As in the comparative example illustrated in FIGS. 6A to 6C, the first and second output terminals 121 and 122 may be arranged or spaced apart in or along the short side direction Z2 of the envelope S1 and S2 surrounding the group of battery cells 10, a voltage of the adjacent battery cells 10 may be relatively increased compared to the embodiment illustrated in FIG. 5, and the greatest potential difference (highest voltage) may occur in the portions indicated by the dashed line oval in FIGS. 6A to 6C, and a greatest potential difference (highest voltage) exceeding 200 V or approaching 200 V may occur. In the comparative examples illustrated in FIGS. 6A to 6C, the greatest potential difference (highest voltage) may be 210 V, 180.6 V, and 273 V, respectively.

In the comparative examples illustrated in FIGS. 6A to 6C, an arrangement of the multiple bus bars 120 or an electrical connection direction of the battery cells 10 in which the multiple bus bars 120 are arranged may be formed in the column direction Z1 (parallel to the long side direction Z1 of the envelope S1 and S2) rather than a transverse direction Z2 (closer in direction to the short side direction Z2 of the envelope S1 and S2). Thus, a potential difference between the adjacent battery cells 10 may increase, and a risk of an electric short-circuit between the adjacent battery cells 10 may be increased. In the comparative example of FIG. 6C, an electrical connection direction of the battery cells 10 may be formed in a transverse direction closer in direction to the short side direction Z2 of the envelope S1 and S2, and an arrangement of the bus bars 120 arranged in the transverse direction may be repeated in the column direction Z1 parallel to the long side direction Z1 of the envelope S1 and S2 by using the arrangement of the bus bars 120 arranged in the transverse direction as one unit, and by repeating the arrangement of the bus bars 120 arranged in the transverse direction while reciprocating in the column direction Z1. The greatest potential difference (highest voltage) between the adjacent battery cells 10 in the portion indicated by the dashed line oval may increase. In an implementation, as illustrated in FIG. 5, an arrangement of the bus bars 120 arranged in the transverse direction may be repeated along the column direction Z1 parallel to the long side direction Z1 of the envelope S1 and S2, but the arrangement of the bus bars 120 arranged in the transverse direction may be repeated only in one direction from one short side S2 of the envelope S1 and S2 to the other short side S2 of the envelope S1 and S2 in the column direction Z1 and may not repeat while reciprocating between both short sides S2 in one direction and an opposite direction. In an implementation, as illustrated in FIG. 5, the connection structure of the bus bars 120 may extend across an entire width of the battery pack in the transverse direction Z2 in the zig zag arrangement. In an implementation, arrays of battery cells 10 that are aligned along the transverse direction Z2 may be connected by arrays of bus bars 120 that extend in the zig zag arrangement generally along the transverse direction Z2. A battery cell at an end of an array of battery cells 10 may be connected to an adjacent battery cell 10 at an end of an adjacent array of battery cells 10 via a bus bar 120 that extends lengthwise in the column direction Z1 between the adjacent arrays of battery cells 10.

Referring to FIG. 5, in one embodiment, a group of the bus bars 120 forming a battery pack or a group of the battery cells 10 forming a battery pack may include a low voltage portion LV from the first output terminal 121 connected to the low-potential battery cell 10 having the lowest potential to the first fuse terminal 123, and a high voltage portion HV from the second output terminal 122 connected to the high-potential battery cell 10 having the highest potential to the second fuse terminal 124. In this case, the first and second fuse terminals 123 and 124 may indicate the fuse terminals 123 and 124 relatively close to the first and second output terminals 121 and 122 in an electrical connection direction of the battery cells 10 among a pair of the fuse terminals 123 and 124 connected to a fuse box, respectively, and may indicate the fuse terminals 123 and 124 connected to the first and second output terminals 121 and 122 in the electrical connection direction without passing through a fuse box.

In an implementation, the low voltage portion LV and the high voltage portion HV may cross between the first and second fuse terminals 123 and 124, and may be asymmetrically arranged with respect to a virtual line O parallel to the short side direction Z2 of the envelope S1 and S2 (e.g., passing through a center of the battery pack). In an implementation, the high voltage portion HV may include a high voltage deflection portion HVe biased toward the low voltage portion LV (e.g., crossing the virtual line O in the long side direction Z1 of the envelope S1 and S2), and the low voltage portion LV may include a low voltage deflection portion LVe biased toward an opposite side from the high voltage deflection portion HVe in the short side direction Z2 by avoiding the high voltage deflection portion HVe. In an implementation, the high voltage deflection portion HVe and the low voltage deflection portion LVe may be arranged opposite to each other in the short side direction Z2 of the envelope S1 and S2. The low-voltage deflection portion LVe may be arranged at a position relatively close to (e.g., proximate to) the first and second fuse terminals 123 and 124 in the short side direction Z2 of the envelope S1 and S2. The high voltage deflection portion HVe may be arranged at a location relatively distant from (e.g., distal to) the first and second fuse terminals 123 and 124. In an implementation, the high voltage deflection portion HVe and the low voltage deflection portion LVe may extend relatively long in the long side direction Z1 and the short side direction Z2 of the envelope S1 and S2. In an implementation, the high voltage deflection portion HVe may extend relatively longer in the long side direction Z1 than the short side direction Z2 so as to be biased toward the low voltage portion LV. The low voltage deflection portion LVe may extend relatively longer in the short side direction Z2 than in the long side direction Z1 while avoiding the high voltage deflection portion HVe.

In an implementation, the high voltage portion HV and the low voltage portion LV may have an asymmetric arrangement about the virtual line O, and thereby, compatibility that a battery management system (BMS) may be shared with each other may be provided in a structure (64-cell structure) in which a group of the battery cells 10 forming a battery pack is 64 and a structure (72-cell structure) in which a group of the battery cells 10 forming a battery pack is 72. In an implementation, the BMS may include a pin-map corresponding to positions of the battery cells 10 and a fuse box, and in the 64-cell structure, a fuse box is between a 32nd pin (32nd battery cell in an electrical connection direction of the battery cell 10) and a 33rd pin (33rd battery cell in the electrical connection direction of the battery cell 10). In an implementation, in the 64-cell structure, a fuse box may be located at an intermediate position in the electrical connection direction of the battery cells 10, that is, between the 32nd battery cell 10 and the 33rd battery cell 10.

In an implementation, even in the 72-cell structure illustrated in FIG. 5, a structure in which the fuse box is between the 32nd pin (32nd battery cell 10 in the electrical connection direction of the battery cell 10) and 33rd pin (33rd battery cell 10 in the electrical connection direction of the battery cell 10) is implemented as in the 64-cell structure, and thereby, the BMS may be used as a common component in the 64-cell structure and the 72-cell structure. That is, the BMS including the same pin-map may be commonly applied to the 64-cell structure and the 72-cell structure.

In an implementation, in the 72-cell structure designed to have compatibility of the BMS with the 64-cell structure, a battery management system (BMS), the number of bus bars 120 (or the battery cells 10 of the high voltage portion HV) of the high voltage portion HV may be relatively greater than the number of bus bars 120 (or the battery cells 10 of the low voltage portion LV) of the low voltage portion LV in an electrical connection direction of the battery cells 10 by using a fuse box as a boundary, and the high voltage portion HV including a relatively large number of bus bars 120 may include the high voltage deflection portion HVe biased toward the low voltage portion LV, and the low voltage portion LV may include the low voltage deflection portion LVe so as to avoid the high voltage deflection portion HVe.

Referring to FIG. 7, the battery cells 10 may be assembled to (e.g., accommodated in) the cell holder 110. In an implementation, the cell holder 110 may have one side on or in which the battery cells 10 are assembled, and have the other side on which a hollow protrusion portion 115 connected to the cooling flow path F between the adjacent battery cells 10 protrudes. As will be described below, the hollow protrusion portion 115 may extend through the circuit board 130 on the other side of the cell holder 110. Hereinafter, the cell holder 110 will be described in greater detail.

The cell holder 110 may include an upper holder 110a (to or in which the upper end portion 10a of the battery cell 10 is fitted), and a lower holder 110b (to or in which the lower end portion 10b of the battery cell 10 is fitted). In addition, except for the upper end portion 10a and the lower end portion 10b of the battery cell 10 fitted to the upper holder 110a and the lower holder 110b, a center position may be exposed between the upper holder 110a and the lower holder 110b in a height direction of the battery cell 10. In this case, the cooling flow path F may be between the adjacent battery cells 10, and the central position of the battery cell 10 exposed between the upper holder 110a and the lower holder 110b may be cooled by being directly exposed to a cooling medium flowing through the cooling flow path F. In an implementation, the cooling medium may be, e.g., low-temperature air introduced from the outside of the battery pack. In an implementation, the cooling medium may include a cooling medium in a gaseous state other than air, and may include, e.g., refrigerant gas.

The upper holder 110a and the lower holder 110b may include an assembly rib 111 fitted or coupled to each of the upper end portion 10a and the lower end portion 10b of the battery cell 10, and the assembly rib 111 may regulate an assembly position of the battery cell 10 while surrounding the upper end portion 10a and the lower end portion 10b of the battery cell 10. The assembly rib 111 may protrude inwardly from a (e.g., plate-shaped) body of the cell holder 110 toward the battery cell 10 in a height direction of the battery cell 10, and may support the battery cell 10 while surrounding the upper end portion 10a and the lower end portion 10b of the battery cell 10.

Terminal holes 112 exposing the first and second electrodes 11 and 12 of the battery cell 10 may be in the cell holder 110. The first and second electrodes 11 and 12 of the battery cell 10 exposed through the terminal hole 112 may be electrically connected to the other adjacent battery cells 10 through the bus bar 120. In an implementation, the terminal hole 112 may be within a region surrounded by the assembly rib 111 to which the upper end portion 10a or the lower end portion 10b of the battery cell 10 including the first and second electrodes 11 and 12 are assembled, in the cell holder 110.

As illustrated in FIG. 3, in one embodiment, the vent portion 13 may be in at least one of the upper end portion 10a and the lower end portion 10b of the battery cell 10, and the vent the portion 13 may be along a rim of one end portion surrounding the second electrode 12 at one end portion of the battery cell 10. In this case, referring to FIG. 7, the terminal hole 112 may be formed to have a sufficient size (e.g., diameter) so as to expose the vent portion 13 (along the rim of the one end portion surrounding the second electrode 12 of the battery cell 10) together with the second electrode 12 of the battery cell 10. In an implementation, the adjacent battery cells 10 may be arranged in the inverted pattern in a height direction, and accordingly, the vent portion 13 of the battery cell 10 may be on the upper end portion 10a of the battery cell 10 or the lower end portion 10b of the battery cell 10, depending on positions of the specific battery cells 10, and in this case, the terminal holes 112 in the upper and lower holders 110a and 110b may have a sufficient size (e.g., diameter) to expose the vent portions 13 respectively formed in the upper end portion 10a and the lower end portion 10b of the battery cell 10.

Referring to FIG. 7, exhaust gas emitted through the vent portion 13 of the battery cell 10 may flow through the exhaust path on the cell holder 110 through the terminal hole 112 of the cell holder 110 and may be emitted to the outside of the battery pack through an exhaust hole DH on one side of the cell holder 110. In an implementation, the exhaust hole DH may be on one side of the cell holder 110, and the exhaust hole DH may be in fluid connection with the vent portions 13 of the multiple battery cells 10 to collect the exhaust gas emitted from the vent portion 13 and emit the exhaust gas to the outside of the battery pack. In an implementation, the exhaust hole DH may be at a rim (e.g., outer edge or side) of the cell holder 110 and may be at the rim position in a long side direction of the cell holder 110.

Throughout the present specification, the long side direction of the cell holder 110 may correspond to the long side direction Z1 of the envelope S1 and S2 (see FIG. 4) surrounding a group of battery cells 10 forming a battery pack. In an implementation, assuming that a group of battery cells 10 forming a battery pack is surrounded by a rectangular envelope S1 and S2 (see FIG. 4) including a pair of long sides S1 and a pair of short sides S2 extending to linearly surround an outer periphery of the group of battery cells 10 across an outer circumference of the group of battery cells 10, the long side direction Z1 of the envelope S1 and S2 may correspond to a long side direction of the cell holder 110.

Referring to FIG. 7, in one embodiment, the battery cells 10 may be arranged in a vertically inverted pattern in a height direction of the battery cells 10. In an implementation, the multiple battery cells 10 may include first and second groups of the battery cells 10 arranged in a pattern that is vertically inverted from each other. In an implementation, the first group of battery cells 10 may include the vent portions 13 at the upper end portions 10a, and the second group of battery cells 10 may include the vent portions 13 at the lower end portions 10b.

Referring to FIGS. 7 and 8, the cell holder 110 may include an upper holder 110a to which the upper end portions 10a of the first group of battery cells 10 are assembled, and a lower holder 110b to which the lower end portions 10b of the second group of battery cells 10 are assembled. In an implementation, the upper holder 110a and the lower holder 110b may accommodate the first and second groups of battery cells therebetween and may be assembled to face each other, and may provide a space for accommodating the first and second groups of battery cells 10. In this case, an upper exhaust hole DHa for collecting exhaust gas emitted from the upper end portions 10a (e.g., the vent portions 13) of the first group of battery cells 10 may be in an upper surface of the upper holder 110a. A lower exhaust hole DHb for collecting exhaust gas emitted from the lower end portions 10b (e.g., the vent portions 13) of the second group of battery cells 10 may be in a lower surface of the lower holder 110b. In this case, an exhaust path connecting the upper end portions 10a (e.g., the vent portions 13) of the first group of battery cells 10 to the upper exhaust hole DHa may be formed. In the lower surface of the lower holder 110b, and an exhaust path connecting the lower end portions 10b (e.g., the vent portions 13) of the second group of battery cells 10 to the lower exhaust hole DHb may be in the lower surface of the lower holder 110b. Referring to FIG. 1, an upper separation member 140a and a lower separation member 140b forming respective exhaust paths may be arranged on the upper surface of the upper holder 110a and the lower surface of the lower holder 110b, and in this case, the exhaust paths may be respectively formed between the upper surface of the upper holder 110a and the upper separation member 140a, and between the lower surface of the lower holder 110b and the lower separation member 140b. In an implementation, the exhaust path may be between the upper surface of the upper holder 110a and a block region 144 of the upper separation member 140a, and between the lower surface of the lower holder 110b and a block region 144 of the lower separation member 140b. More detailed technical description of the upper separation member 140a, the lower separation member 140b, and the block regions 144 will be made below.

Referring to FIGS. 7 and 8, the upper exhaust hole DHa and the lower exhaust hole DHb may be in edges corresponding to each other of the upper holder 110a and the lower holder 110b and may be formed at, e.g., one rim of the cell holder 110 in a long side direction thereof. In an implementation, an exhaust duct DD (continuously extending in a height direction) may be in edges of the upper holder 110a and the lower holder 110b in which the upper exhaust hole DHa and the lower exhaust hole DHb are formed respectively. The exhaust duct DD may be continuously formed through the upper holder 110a and the lower holder 110b in a height direction, and when the upper holder 110a and the lower holder 110b are assembled together, some of the exhaust duct DD in the upper holder may be connected to the remaining portion of the exhaust duct DD in the lower holder 110b to form a complete exhaust duct DD having a single tubular shape. In an implementation, the exhaust duct DD may include a portion in the upper holder 110a and the remaining portion in the lower holder 110b, and the exhaust duct DD may be divided to be formed in the upper holder 110a and the lower holder 110b. For reference, throughout the present specification, the height direction may indicate a height direction of the battery cell 10 and may indicate a lengthwise (e.g., long axis) direction of the battery cell 10 as a largest dimension of the battery cell 10.

The exhaust duct DD may form a space separated from an accommodation space of the battery cells 10 formed by assembling the upper holder 110a and the lower holder 110b, and may be formed in a sealed structure except for a location in which the upper exhaust hole DHa that exhaust gas is introduced is connected to the lower exhaust hole DHb, and a location connected to the exhaust pipe DP from which the exhaust gas is emitted to the outside of the cell holder 110.

The upper exhaust hole DHa and the lower exhaust hole DHb may be connected at both ends of the exhaust duct DD in a height direction. In an implementation, the exhaust pipe DP may be connected to a location or position between both ends of the exhaust duct DD in a height direction. In an implementation, the exhaust duct DD may continuously extend through the upper holder 110a and the lower holder 110b in a height direction to be connected to the upper exhaust hole DHa and the lower exhaust hole DHb at both ends thereof, and may be connected, at a height or position between both ends, to the exhaust pipe DP, for collecting the entire exhaust gas introduced from the upper exhaust hole DHa and the lower exhaust hole DHb to emit the gas to the outside of the cell holder 110. In this case, the exhaust pipe DP may be connected to the exhaust duct DD at a height between upper and lower surfaces of the cell holder 110 in a height direction and may protrude from the cell holder 110 toward the outside at a height between the upper and lower surfaces of the cell holder 110. In an implementation, the exhaust pipe DP may protrude from an outer surface of the cell holder 110 to the outside in a long side direction of the cell holder 110. In an implementation, the exhaust pipe DP may be at a height between the upper surface of the upper holder 110a and the lower surface of the lower holder 110b and may be in one of the upper holder 110a and the lower holder 110b and may be formed between the upper surface of the upper holder (110a) and the lower surface of the lower holder (110b) at a height close to either the upper surface of the upper holder 110a or the lower surface of the lower holder 110b. In an implementation, the exhaust pipe DP may protrude outwardly from the upper holder 110a and may be at a height or position relatively close to (e.g., proximate to) the upper surface of the upper holder 110a, at a height between the upper surface of the upper holder 110a and the lower surface of the lower holder 110b. As illustrated in FIG. 1, in one embodiment, the circuit board 130 may be on the upper holder 110a, and the circuit board 130 may be between the upper surface of the upper holder 110a formed with the exhaust path and the upper separation member 140a to form of flow resistance on the exhaust path, and the exhaust pipe DP may be at a height biased or proximate to the upper surface of the upper holder 110a (among the upper surface of the upper holder 110a and the lower surface of the lower holder 110b) to form a balanced flow resistance between the exhaust path in the upper holder 110a and the exhaust path in the lower holder 110b. As illustrated in FIG. 1, with respect to the circuit board 130 on the upper holder 110a, the upper exhaust hole DHa on the upper surface of the upper holder 110a may be at a position out of the circuit board 130 so that a flow of exhaust gas introduced into the upper exhaust hole DHa may not be disturbed by the circuit board 130. The circuit board 130 may be on the upper holder 110a and may be formed locally over a partial area of the upper holder 110a without being formed over the entire area of the upper holder 110a, and thereby, the upper exhaust hole DHa may be prevented from being blocked by the circuit board 130 by forming the upper exhaust hole DHa on the upper holder 110a exposed from the circuit board 130.

Referring to FIG. 8, the exhaust pipe DP may form an end of the exhaust path through which exhaust gas emitted from the first and second groups of battery cells 10 accommodated in the cell holder 110 is emitted to the outside of the cell holder 110. In an implementation, the upper exhaust hole DHa, the lower exhaust hole DHb, and the exhaust duct DD may have different configurations, and this is for the sake of easy understanding, and both ends of the exhaust duct DD continuously extending through the upper holder 110a and the lower holder 110b in a height direction may form the upper exhaust hole DHa and the lower exhaust hole DHb, and the upper exhaust hole DHa, the lower exhaust hole DHb, and the exhaust duct DD may be formed together as one tubular shape continuously extending in the height direction.

Referring to FIG. 7, the hollow protrusion portion 115 for forming the cooling flow path F may be formed in the cell holder 110. The hollow protrusion portion 115 may include a central hollow portion forming the cooling flow path F, and a wall body 115a surrounding the central hollow portion (e.g., may be a hollow cylinder). In an implementation, the hollow protrusion portion 115 may include a circular wall body 115a surrounding the central hollow portion. In an implementation, the circular wall body 115a of the hollow protrusion portion 115 may indicate a shape of an outer surface forming an outer circumference of the hollow protrusion portion 115, and a shape of an inner surface of the hollow protrusion portion 115 may be formed in a shape different from a circular shape. In an implementation, the circular wall body 115a of the hollow protrusion portion 115 may have a circular outer surface and a triangular inner surface having rounded corners. In an implementation, the hollow protrusion portions 115 may have the wall body 115a of one of various shapes including an oval shape or a polygonal shape, e.g., hexagonal shape, surrounding the central hollow portion and may have the inner shape of one of various shapes such as a circular shape, an elliptical shape, a polygonal shape, and a combination thereof together with the outer surface of an oval shape or one of various polygonal shapes.

The hollow protrusion portion 115 may protrude from the plate-shaped body of the cell holder 110 in a height direction opposite to or away from the battery cell 10. In an implementation, the hollow protrusion portion 115 may extend the cooling flow path F formed between the adjacent battery cells 10 to the outside of the battery cell 10 in a height direction of the battery cell 10, and may form the cooling flow path F surrounded by the wall body 115a (e.g., the hollow protrusion portion 115 may be vertically aligned with spaces between battery cells 10). In an implementation, a position at which the hollow protrusion portion 115 is formed along the body of the cell holder 110 may correspond to a position of the cooling flow path F between the battery cells 10, and the position at which the hollow protrusion portion 115 is formed may correspond to the position of the cooling flow path F described with reference to FIG. 4, and the position of the cooling flow path F in FIG. 4 may indicate the hollow protrusion portion 115.

Referring to FIG. 1, the hollow protrusion portion 115 may sequentially penetrate through the circuit board 130 and the separation member 140 on the cell holder 110 in the height direction of the battery cell 10, and in this case, the hollow protrusion portion 115 may form the cooling flow path F extending across a battery pack so as to penetrate almost the entire battery pack in the height direction of the battery cell 10. In an implementation, the hollow protrusion portion 115 of the upper holder 110a may sequentially penetrate the circuit board 130 and the upper separation member 140a on the upper holder 110a in the height direction of the battery cell 10, and the hollow protrusion portion 115 of the lower holder 110b may penetrate the lower separation member 140b arranged on the lower holder 110b in the height direction of the battery cell 10. Opening regions 135 and 145 (to allow the hollow protrusion portion 115 to be fitted thereto) may be in the circuit board 130 and in the separation member 140. The opening regions 135 and 145 of the circuit board 130 and the separation member 140 may be formed in a shape in which a position corresponding to the hollow protrusion portion 115 is opened along the circuit board 130 and the separation member 140. The opening regions 135 and 145 of the circuit board 130 and the separation member 140 will be described below in greater detail.

Referring to FIGS. 1 and 2, the bus bar 120 may be on the cell holder 110. In an implementation, the upper bus bar 120a and the lower bus bar 120b may be respectively arranged on the upper holder 110a and the lower holder 110b, and the bus bars 120 may be alternately arranged at alternate positions on the upper holder 110a and the lower holder 110b and may connect the adjacent battery cells 10 in an electrical connection direction. As described above, each of the bus bars 120 may electrically connect a pair of the battery cells 10 in the electrical connection direction, and the multiple bus bars 120 may be arranged in the electrical connection direction of the battery cells 10 to electrically connect a group of the battery cells 10.

Referring to FIG. 9, the bus bar 120 may include coupling pieces 120a at both ends, a central protrusion connection piece 120c coupling the coupling pieces 120a to each other, and bent portions 120b coupling the coupling pieces 120a at both ends to the central protrusion connection piece 120c in a bent shape. The coupling pieces 120a at both ends of the bus bar 120 may be connected to the upper end portion 10a of the adjacent battery cell 10 or the lower end portion 10b of the adjacent battery cell 10, and may be connected to the upper end portion 10a or the lower end portion 10b of the adjacent battery cell 10 exposed through the terminal hole 112 of the cell holder 110 to connect the first and second electrodes 11 and 12 of the adjacent battery cell 10 to each other in series or in parallel. In an implementation, the coupling pieces 120a at both ends of the bus bar 120 and the adjacent battery cells 10 may be welded together.

The bent portions 120b connect the coupling pieces 120a at both ends to the central protrusion connection piece 120c in a bent shape, and by supporting the protrusion connection piece 120c at a level spaced apart from the battery cell 10 from the connection pieces 120a at both ends in the height direction of the battery cell 10, electrical interference between the protrusion connection piece 120c and the battery cell 10 may be blocked, and the connection pieces 120a at both ends may be pressed toward the upper end portion 10a or the lower end portion 10b of the battery cell 10 while being elastically deformed according to the protrusion connection piece 120c pressed toward the battery cell 10 by the cell holder 110 (e.g., the hollow protrusion portion 115). This will be described below in greater detail.

The protrusion connection piece 120c may correspond to a flat plate-shaped member spaced farthest from the battery cell 10 among the bus bars 120 in the height direction of the battery cell 10, and may be arranged on a virtual plane located farthest from the battery cell 10 among the bus bars 120. As illustrated in FIG. 10, the protrusion connection piece 120c may be exposed from the circuit board 130 arranged on the cell holder 110, and the whole of the protrusion connection piece 120c may be exposed from the circuit board 130 (a solid portion of the circuit board 130) through an escape hole 132a of the circuit board 130.

Referring to FIG. 9, the bus bar 120 may extend across a space between the hollow protrusion portions 115 of the cell holder 110. In an implementation, the bus bar 120 may extend across a space between a pair of the hollow protrusion portions 115, and the protrusion connection piece 120c of the bus bar 120 may be placed between the pair of hollow protrusion portions 115. An extension direction of the bus bar 120 and a direction in which the pair of hollow protrusion portions 115 face each other may cross each other, for example, may cross vertically.

In an implementation, the bus bar 120 may electrically connect a pair of adjacent battery cells 10 while extending across the pair of battery cells 10 of which outer circumferences are adjacent, and in this case, the cooling flow path F or the hollow protrusion portion 115 may be between the pair of battery cells 10 connected by the bus bar 120 and the other pair of battery cells 10 facing each other in a direction crossing the bus bar 120. Accordingly, the bus bar 120 may extend across a pair of the hollow protrusion portions 115 facing each other in a direction crossing the bus bar 120.

A pair of hollow protrusion portions 115 facing each other and having the bus bar 120 therebetween, e.g., a pair of locking protrusions 115p for fitting and assembling the bus bar 120 thereto may be in the wall bodies 115a, which face each other, of the pair of hollow protrusions 115. In an implementation, the locking protrusion 115p may be on the wall body 115a of the hollow protrusion portion 115, and the bus bar 120, e.g., the protrusion connection piece 120c of the bus bar 120 may be fitted and assembled to the locking protrusion 115p of a wedge shape. The bus bar 120 fitted and assembled to the locking protrusion 115p may be effectively prevented from being separated from the battery cell 10 in a distant direction. A pair of the locking protrusions 115p may be on the pair of hollow protrusion portions 115 facing each other with the bus bar 120 therebetween, and the pair of locking protrusions 115p may extend from the wall body 115a of the hollow protrusion portion 115 onto the protrusion connection piece 120c of the bus bar 120 to press the protrusion connection piece 120c toward the battery cell 10, and the coupling pieces 120a at both ends of the bus bar 120 may be pressed toward the upper end portion 10a or the lower end portion 10b of the battery cell 10 due to elastic deformation of the bent portion 120b connected to the protrusion coupling piece 120c, and thus, the bus bar 120 may be firmly bonded to the battery cells 10.

Referring to FIG. 9, a mold hole 110' may be in the cell holder 110 corresponding to the pair of locking protrusions 115p. In an implementation, the hollow protrusion portion 115 having the locking protrusion 115p protrudes from a main body of the cell holder 110 formed in a plate shape, and the mold hole 110' may be formed in the main body of the cell holder 110 corresponding to the locking protrusion 115p to penetrate the main body of the cell holder 110. The mold hole 110' may be formed at a coupling position between an upper mold and a lower mold when the cell holder 110 having the locking protrusion 115p is formed, and a portion that is not filled with a molten resin by a coupling hole between the upper mold and the lower mold may remain in the form of the mold hole 110'. In an implementation, the cell holder 110 having the locking protrusion 115p therein may be easily demolded from a mold through a mold having a shape in which the upper mold is combined with the lower mold, and it is possible to prevent a shape of the locking protrusion 115p of the cell holder 110 from being damaged in while being demolded.

Referring to FIG. 9, a position alignment hole 120g for aligning a position of the cell holder 110 may be in the protrusion connection piece 120c of the bus bar 120. A position alignment pin 110g for being fitted to the position alignment hole 120g of the protrusion connection piece 120c may be between a pair of the hollow protrusion portions 115 having the protrusion connection piece 120c including the position alignment hole 120g therebetween, e.g., on a main body of the cell holder 110 in which the pair of hollow protrusion portions 115 are formed. In this case, while the position alignment hole 120g of the protrusion connection piece 120c is fitted to the position alignment pin 110g of the cell holder 110, the bus bar 120 may be assembled to a correct position on the cell holder. The position alignment pin 110g may include a pair of position alignment pins 110g arranged in an extension direction of the bus bar 120. In this case, the extension direction of the bus bar 120 in which the paired position alignment pins 110g are arranged may cross a direction in which the pair of hollow protrusion portions 115 having the bus bar 120 therebetween face each other, e.g., may cross vertically. In an implementation, the position alignment hole 120g and the position alignment pin 110g may be respectively on the bus bar 120 and the cell holder 110 to which the bus bars 120 are assembled, and in another embodiment, the position alignment hole 120g and the position alignment pin 110g may also be respectively on the cell holder 110 and the bus bar 120, and may be selectively on any one side and the other side of the cell holder 110 and the bus bar 120 in a range in which the position alignment hole 120g and the position alignment pin 110g are formed at corresponding positions.

Referring to FIGS. 10 and 11, the coupling pieces 120a at both ends of the bus bar 120 may be exposed from the circuit board 130 arranged on the bus bar 120, and more specifically, may be exposed from the circuit board 130 (a solid portion of the circuit board 130) through a filling hole FH of the circuit board 130. In an implementation, the filling hole FH may expose at least some of the coupling piece 120a of the bus bar 120. In addition, as the coupling piece 120a of the bus bar 120 connected to the upper end portion 10a of the battery cell 10 is exposed through the filling hole FH of the circuit board 130, a potting resin PR filling the filling hole FH may cover and protect a coupling portion between the upper end portion 10a of the battery cell 10 and the coupling piece 120a of the bus bar 120. In an implementation, the potting resin PR may protect the coupling portion between the battery cell 10 and the coupling piece 120a of the bus bar 120 from harmful components such as oxygen or moisture and may protect, e.g., a coupling portion between heterogeneous materials formed by welding from galvanic corrosion. In an implementation, the filling hole FH may be at a central position of the upper end portion 10a of each of the battery cells 10 to expose the bus bar 120 (e.g., the coupling pieces 120a at both ends of the bus bar 120) connected to a central position of the upper end portion 10a of each battery cell 10.

Referring to FIGS. 10 and 12, the circuit board 130 may be arranged on the bus bar 120. The escape hole 132a for exposing some of the bus bar 120 may be formed in the circuit board 130. More specifically, the escape hole 132a may expose the entire protrusion connection piece 120c at the center of the bus bar 120. Here, that the escape hole 132a exposes the entire protrusion connection piece 120c may indicate that all of the protrusion connection piece 120c is completely exposed from the circuit board 130 through the escape hole 132a. In an implementation, the protrusion connection piece 120c may not overlap the circuit board 130 (a solid portion of the circuit board 130), and even some thereof may not overlap the circuit board 130 (a solid portion of the circuit board 130).

Referring to FIG. 12, the escape hole 132a may accommodate the protrusion connection piece 120c, and the protrusion connection piece 120c may be at a height between the lower surface 130a and the upper surface 130b of the circuit board 130 in a height direction. Here, the lower surface 130a and the upper surface 130b of the circuit board 130 may indicate respectively a surface facing the battery cell 10 and a surface opposite to the battery cell 10 among both surfaces of the circuit board 130. In an implementation, the coupling pieces 120a at both ends of the bus bar 120 may overlap the lower surface 130a of the circuit board 130 (a solid portion of the circuit board 130), but the protrusion connection piece 120c connected through the bent portion 120b from the coupling pieces 120a does not overlap the lower surface 130a of the circuit board 130 (a solid portion of the circuit board 130) and is accommodated in the escape hole 132a at a height between the upper surface 130b and the upper surface 130b of the circuit board 130 in a height direction so as not to for an additional thickness for the thickness of the circuit board 130 in the height direction.

The protrusion connection piece 120c of the bus bar 120 and the circuit board 130 (a solid portion of the circuit board 130) may be arranged so as not to overlap each other through the escape hole 132a, and thereby, the circuit board 130 may be arranged at a position close to the battery cell 10, e.g., a low height close to the battery cell 10, and by reducing an interval q between the circuit board 130 and the battery cell 10 in the height direction, a length of a coupling member 125 forming a voltage measurement line between the circuit board 130 and the battery cell 10 may be reduced, and for example, when coupling one end portion and the other end portion of the coupling member 125 to each of the circuit board 130 and the battery cell 10, wire bonding or ribbon bonding is performed by using ultrasonic welding for solid bonding, and it is possible to prevent the ultrasonic welding from failing due to relative shaking between the circuit board 130 and the battery cell 10 during the ultrasonic welding.

In addition, by arranging the protrusion connection piece 120c of the bus bar 120 and the circuit board 130 (a solid portion of the circuit board 130) in a height direction through the escape hole 132a so as not to overlap each other, the circuit board 130 may be arranged at a low height close to the battery cell 10, and by reducing a height of the entire battery pack, a battery pack advantageous for slimming may be provided.

Referring to FIG. 10, the bus bar 120 may extend across a pair of hollow protrusion portions 115, and the protrusion connection piece 120c of the bus bar 120 may be arranged between the pair of hollow protrusion portions 115. In this case, the escape hole 132a may be formed at a position corresponding to the protrusion connection piece 120c on the circuit board 130, that is, a position between the pair of hollow protrusion portions 115. The escape hole 132a may be formed as some of a bus opening region 132b that exposes a pair of hollow protrusion portions 115 formed at positions facing each other with the bus bar 120 therebetween or the cooling flow path F together with the protrusion connection piece 120c of the bus bar 120. In an implementation, the circuit board 130 may have the bus opening region 132b exposing the hollow protrusion portion 115 together with the protrusion connection piece 120c of the bus bar 120 and may be formed in a single hole form by being connected to the escape hole 132a for exposing the protrusion connection piece 120c of the bus bar 120.

The bus opening region 132b may be in a single hole form formed in the circuit board 130 to expose some of the bus bar 120, e.g., the protrusion connection piece 120c of the bus bar 120 together with a pair of hollow protrusion portions 115 (or a pair of cooling flow paths F) facing each other with the bus bar 120 therebetween. In this case, the escape hole 132a that entirely exposes the protrusion connection piece 120c of the bus bar 120 may indicate a region excluding a region through which the hollow protrusion portion 115 passes in the bus opening region 132b formed in a single hole form.

If one hole for exposing the protrusion connection piece 120c of the bus bar 120 and two holes for exposing respectively the adjacent cooling flow paths F were to be separately formed with a narrow interval therebetween, e.g., if three holes were to be individually formed with narrow intervals therebetween, there is a possibility of damage to the circuit board 130. In an implementation, the protrusion connection piece 120c of the bus bar 120 and a pair of adjacent cooling flow paths F may be exposed together through the bus opening region 132b formed in a single hole form, and thereby, a structure of the circuit board 130 may be simplified and a possibility of breakage due to insufficient rigidity of the circuit board 130 may be reduced.

The bus opening region 132b may expose a pair of cooling flow paths F (or the hollow protrusion portions 115) facing each other with the bus bar 120 therebetween. As will be described below, the bus opening region 132b may be in a single hole form together with a coupling opening region 132c that exposes a pair of cooling flow paths F (or the hollow protrusion portions 115) facing each other with the coupling member 125 therebetween, and the bus opening region 132b and the coupling opening region 132c may form a second opening region 132 formed in a single hole form. In an implementation, the cooling flow paths F exposed through the second opening region 132 (or the hollow protrusion portion 115) may include a pair of cooling flow paths F (or first and second hollow protrusion portions 1151 and 1152) facing each other with the bus bar 120 therebetween and a pair of cooling flow paths F (or first and third hollow protrusions 1151 and 1153) facing each other with the coupling member 125 therebetween, and share the cooling flow paths F (or the first hollow protrusion portion 1151) between the bus bar 120 and the coupling member 125, and include three different cooling flow paths F as a whole. In an implementation, the hollow protrusion portion 115 exposed through the second opening region 132 may include the first hollow protrusion portion 1151 between the bus bar 120 and the coupling member 125, the second hollow protrusion portion 1152 facing the first hollow protrusion portion 1151 with the bus bar 120 therebetween, and the third hollow protrusion portion 1151 facing the first hollow protrusion with the coupling member 125 therebetween, e.g., may include three hollow protrusion portions 115 as a whole.

In an implementation, the escape hole 132a exposing the protrusion connection piece 120c of the bus bar 120 may be formed as some of the second opening region 132, and the protrusion connection piece 120c of the bus bar 120 may be exposed through the second opening region 132, and the entire protrusion connection piece 120c may be completely exposed from the circuit board 130 (a solid portion of the circuit board 130) through the second opening region 132.

Referring to FIG. 10, an opening region 135 opened in a hole form may be formed in the circuit board 130 to allow the cooling flow path F (or the hollow protrusion portion 115) to pass therethrough. The cooling flow path F may penetrate the opening region 135 of the circuit board 130 and extend across the circuit board 130, and for example, the cooling flow path F may penetrate the opening region 135 of the circuit board 130 while the hollow protrusion portion 115 of the cell holder 110 is fitted to the opening region 135 of the circuit board 130. To this end, the opening region 135 of the circuit board 130 may be at a position corresponding to the hollow protrusion portion 115 of the cell holder 110, and may be formed in a form corresponding to the hollow protrusion portion 115 of the cell holder 110. In an implementation, the opening region 135 (e.g., the first opening region 131) of the circuit board 130 may be formed in a circular shape corresponding to the hollow protrusion portion 115 including the circular wall body 115a. In an implementation, the opening region 135 (e.g., the first opening region 131) of the circuit board 130 may be formed in various shapes corresponding to the hollow protrusion portions 115, e.g., various shapes including ovals or polygonal shapes, e.g., hexagons.

As will be described below, among the opening regions 135, the first opening region 131 may surround an outer circumference of the hollow protrusion portion 115, and the second opening region 132 may surround at least some of the outer circumference of the hollow protrusion portion 115. In an implementation, the second opening region 132 may expose two or more different adjacent hollow protrusion portions 115, and the second opening region 132 may surround at least some of outer circumferences of the different hollow protrusion portions 115 so that two or more different hollow protrusion portions 115 are surrounded together.

The opening region 135 of the circuit board 130 may include first opening regions 131 individually formed for the respective cooling flow paths F (or the hollow protrusion portion 115), and second opening regions 132 formed in common for two or more adjacent cooling flow paths F. In an implementation, each of the second opening regions 132 may include a coupling opening region 132c and a bus opening region 132b. The coupling opening region 132c may be formed in common for a pair of cooling flow paths F facing each other with the coupling member 125 therebetween. Detailed technical matters relating to the coupling member 125 will be described below. The bus opening region 132b may be formed in common for a pair of cooling flow paths F facing each other with the bus bar 120 therebetween. In an implementation, the coupling opening region 132c and the bus opening region 132b may not be formed in the form of independent holes separated from each other, but may be connected to each other to form the second opening region 132 in the form of a single hole. A pair of cooling flow paths F exposed through the coupling opening region 132c and a pair of cooling flow paths F exposed through the bus opening region 132b may not include four different cooling flow paths F as a whole and may include three different cooling flow paths F as a whole by sharing one cooling flow path F. In an implementation, the cooling flow path F at a position where the coupling opening region 132c and the bus opening region 132b meet each other, e.g., the cooling flow path F (or the first hollow protrusion portion 115) between the coupling member 125 and the bus bar 120 may be shared in a pair of cooling flow paths F (or the first and second hollow protrusion portions 1151 and 1152) exposed through the bus opening region 132b, and a pair of cooling flow paths F (or the first and third hollow protrusion portions 1151 and 1153) exposed through a coupling opening region 132c. In other words, the cooling flow path F or the hollow protrusion portion 115 exposed through the second opening region 132 may include the first hollow protrusion portion 1151 between the bus bar 120 and the coupling member 125, the second hollow protrusion portion 1152 facing the first hollow protrusion portion 1151 with the bus bar 120 therebetween, and the third hollow protrusion portion 1153 facing the first hollow protrusion portion 1151 with the coupling member 125 therebetween, e.g., may include three hollow protrusion portions 115 as a whole.

The first opening region 131 may be formed individually for each cooling flow path F, and may be provided in the form of a hole individually formed for each cooling flow path F to expose each cooling flow path F from the circuit board 130. Unlike the first opening region 131, the second opening region 132 may be provided in the form of a single hole formed in common for two or more adjacent cooling flow paths F to expose two or more adjacent cooling flow paths F together, and may expose two or more adjacent cooling flow paths F together from the circuit board 130.

In the second opening region 132, the coupling opening region 132c may expose some of the upper end portion 10a of the battery cell 10 together with a pair of adjacent cooling flow paths F (a pair of cooling flow paths F facing each other with the coupling member 125 therebetween), and in this case, the coupling member 125 may be connected to the upper end portion 10a of the battery cell 10 exposed through the coupling opening region 132c. In an implementation, the coupling opening region 132c may expose some of the upper end portion 10a of the battery cell 10 together with a pair of adjacent cooling flow paths F. As the coupling opening region 132c exposes some of the upper end portion 10a of the battery cell 10, one end portion of the coupling member 125 may be connected to the upper end portion 10a of the battery cell 10 exposed from the circuit board 130 through the coupling opening region 132c, and as the other end portion of the coupling member 125 is connected to the circuit board 130, a voltage measurement line may be formed between the battery cell 10 and the circuit board 130, and the coupling opening region 132c may provide the coupling hole CH for allowing coupling of the coupling member 125 through the circuit board 130. The technical matters relating to the coupling hole CH will be described below in greater detail.

Referring to FIG. 10, in one embodiment, the coupling opening region 132c exposes some of the upper end portion 10a of the battery cell 10 together with a pair of adjacent cooling flow paths F (a pair of cooling flow paths F facing each other with the coupling member 125 interposed therebetween), thereby, functioning as the coupling hole CH, and thus, in one embodiment, the coupling opening region 132c and coupling hole CH may indicate substantially the same configuration, e.g., the same hole formed in the circuit board 130. However, in the present specification, separate reference numerals are assigned to the coupling opening region 132c and the coupling hole CH for the sake of easy understanding.

Some of the upper end portion 10a of the battery cell 10 may be exposed through the coupling hole CH (or the coupling opening region 132c), and the coupling member 125 may be coupled to the upper end portion 10a of the battery cell 10 exposed from the circuit board 130. For example, the coupling member 125 may include a conductive wire or a conductive ribbon including one end portion connected to the upper end portion 10a of the battery cell 10 and the other end portion connected to the circuit board 130, and one end portion and the other end portion of the conductive wire may be bonded respectively to the upper end portion 10a of the battery cell 10 and the circuit board 130 by wire bonding, or one end portion and the other end portion of the conductive ribbon may be bonded respectively to the upper end portion 10a of the battery cell 10 and the circuit board 130 by ribbon bonding. In this case, a conductive wire or a conductive ribbon may be bonded to the upper end portion 10a of the battery cell 10 and the circuit board 130 by ultrasonic welding.

In an implementation, a conductive wire as the coupling member 125 may include a pair of conductive wires extending in parallel to connect the battery cell 10 to the circuit board 130, and each of the battery cells 10 and the circuit board 130 may be firmly connected through a pair of conductive wires in a case in which the conductive wire is disconnected due to an insufficient mechanical strength. The conductive ribbon has a higher mechanical strength than the conductive wire, and thus, it is not necessary to provide a pair for disconnection, and the battery cell 10 and the circuit board 130 may electrically connected to each other by a single conductive ribbon. For reference, the coupling member 125 exemplarily illustrated in FIG. 10 may correspond to a conductive ribbon.

The coupling hole CH may be in a region of the circuit board 130 overlapping a pair of adjacent battery cells 10 to expose the upper end portions 10a of the pair of adjacent battery cells 10 together. In an implementation, the coupling hole CH may be in a region of the circuit board 130 overlapping some of the pair of adjacent battery cells 10, e.g., in a region overlapping a rim of the pair of battery cells 10. In addition, different coupling members 125 may be connected to each of the rims of the adjacent battery cells 10 exposed through the coupling hole CH.

The rims of the upper end portions 10a of the pair of battery cells 10 exposed through the coupling hole CH may form the first electrodes 11 having the same polarity. In an implementation, the adjacent battery cells 10 exposed through the same coupling hole CH may be arranged in a vertically inverted pattern in the height direction of the battery cells 10, and rims of the upper end portions 10a of the battery cells 10 may form the first electrodes 11 having the same polarity, regardless of a vertical arrangement of the battery cells 10. As can be seen in FIG. 3, the can N forming the first electrode 11 extends from the rim of the upper end portion 10a to the entire lower end portion 10b, and thereby, the rim of the upper end portion 10a of the battery cell 10 or the rim of the lower end portion 10b of the battery cell 10 may form the first electrode 11 having the same polarity.

As such, the coupling member 125 may be connected to the rim of the upper end portion 10a of the battery cell 10 exposed through the coupling hole CH and may be connected to the first electrode 11 of the battery cell 10. Referring to FIG. 2, most of the multiple coupling members 125 may be connected to the first electrodes 11 of the battery cells 10 exposed through the coupling holes CH, and some of the coupling members 125 may be connected to the first and second output terminals 121 and 122 or the battery cells 10 connected to the first and second output terminals 121 and 122 and may be connected to the second electrodes 12 of the battery cells 10. In an implementation, the first and second output terminals 121 and 122 may be connected respectively to the low-potential battery cell 10 having the lowest potential and the high-potential battery cell 10 having the highest potential among a group of battery cells 10 electrically connected to each other. In this case, one coupling member 125a may be connected to the first electrode 11 formed on the upper end portion 10a of the low-potential battery cell 10, and the other coupling member 125b may be connected to the second electrode 12 formed on the upper end portion 10a of the high-potential battery cell 10. In an implementation, in a group of coupling members 125 forming a battery pack, one coupling member 125a may be connected to the first electrode 11 of the low-potential battery cell 10 connected to the first output terminal 121, and the other coupling member 125b may be connected to the second electrode 12 of the high-potential battery cell 10 connected to the second output terminal 122, and the coupling member 125 may be connected to the first electrode 11 in a rim of the upper end portion 10a of the battery cell 10 having an intermediate potential other than the high-potential battery cell 10 and the low-potential battery cell 10. In an implementation, the coupling member 125 may be connected to the second electrode 12 of only the high-potential battery cell 10 connected to the second output terminal 122, and may be connected to the first electrode 11 of the other battery cells 10.

Referring to FIG. 10, the coupling opening region 132c (or the coupling hole CH) may be formed with a sufficient area to expose a pair of the adjacent cooling flow paths F (a pair of the cooling flow paths F facing each other with the coupling member 125 therebetween) together with rims of the pair of adjacent battery cells 10. In an implementation, a direction in which a pair of battery cells 10 exposed through the coupling opening region 132c face each other may cross a direction in which a pair of the cooling flow paths F (a pair of the cooling flow paths F facing each other with the coupling member 125 therebetween) exposed through the coupling opening region 132c, and for example, may cross vertically.

If one coupling hole CH for exposing a rim of a pair of the adjacent battery cells 10 and two opening regions 135 for exposing the adjacent cooling flow paths F were to be formed separately from each other with a narrow gap, e.g., if the three holes were to be individually formed with a narrow gap, there is a possibility of damage to the circuit board 130. In an implementation, a pair of the cooling flow paths F adjacent to a rim of a pair of the adjacent battery cells 10 through the coupling hole CH formed in a single hole form or the coupling opening region 132c are exposed together, and thereby, a structure of the circuit board 130 may be simplified and a possibility of damage due to insufficient rigidity of the circuit board 130 may be reduced.

The coupling member 125 for electrically connecting the upper end portion 10a of the battery cell 10 to the circuit board 130 may be between the upper end portion 10a of the battery cell 10 exposed through the coupling opening region 132c or the coupling hole CH and the circuit board 130, and the coupling member 125 may transmit voltage information of the battery cell 10 to the circuit board 130. In an implementation, the coupling members 125 may electrically connect the upper end portions 10a of the battery cells 10 to connection pads 133 of the circuit board 130. The connection pads 133 of the circuit board 130 may be formed around the coupling holes CH, and for example, a pair of connection pads 133 electrically connected to a pair of adjacent battery cells may be formed at positions facing each other around the coupling hole CH.

In an implementation, the coupling opening region 132c, a second opening region 132 may be formed together with the bus opening region 132b that exposes together a pair of the cooling flow paths F facing each other with the bus bar 120 interposed therebetween. In this case, the second opening region 132 may be formed in a single hole form and may extend in an outer circumferential direction surrounding the filling hole FH. The second opening region 132 may expose three different cooling flow paths F which include one cooling flow path F (or first hollow protrusion portion 1151) interposed between the bus bar 120 and the coupling member 125, another cooling flow path F (or the second hollow protrusion portion 1152) with the cooling flow path F (or the first hollow protrusion portion 1151) and the bus bar 120 interposed therebetween, and another cooling flow path F (or the third hollow protrusion portion 1153) with the cooling flow path F (or the first hollow protrusion portion 1151) and the coupling member 125 interposed therebetween, and which are successively arranged in an outer circumferential direction surrounding the filling hole FH as a whole. For example, as illustrated in FIG. 4, six cooling flow paths F may be formed in an outer circumferential direction of one battery cell 10, and among the six cooling flow paths F, three adjacent cooling flow paths F may be exposed together through the second opening region 132.

Referring to FIG. 10, the second opening region 132 may expose three different hollow protrusion portions 115 which include the first hollow protrusion portion 1151 interposed between the bus bar 120 and the coupling member 125, the second hollow protrusion portion 1152 facing the first hollow protrusion portion 1151 with the bus bar 120 interposed therebetween, and the third hollow protrusion portion 1153 facing the first hollow protrusion portion 1151 with the coupling member 125 interposed therebetween, and which are consecutively arranged in an outer circumferential direction surrounding the filling hole FH as a whole.

Referring to FIG. 10, a thermistor TH for measuring a temperature of the battery cell 10 may be arranged at the upper end portion 10a of the battery cell 10. For example, the thermistor TH may be arranged on a rim of the battery cell 10. More specifically, the thermistor TH may be arranged in a different place of a rim of the battery cell 10 spaced apart from a location of a rim of the battery cell 10 to which the coupling member 125 is connected, in an outer circumferential direction of the battery cell 10. That is, the coupling member 125 and the thermistor TH may be arranged at locations spaced apart from each other along the rim of the battery cell 10 to avoid interference with each other. For example, the thermistor TH may be provided as a chip-type thermistor TH that may be directly bonded to the rim of the battery cell 10. In addition, the thermistor TH may be bonded to the rim of the battery cell 10 by solder mounting.

A long hole extending in an outer circumferential direction of the battery cell 10 may be formed in the cell holder 110 to which the battery cell 10 is assembled to expose a rim of the battery cell 10, and the rim of the battery cell 10 may be exposed long through the long hole formed in the cell holder 110, and the coupling member 125 and the thermistor TH may be arranged at locations spaced apart from each other. As illustrated in FIG. 11, an adhesive resin AR may be formed on the coupling member 125 bonded to the rim of the battery cell 10, and the adhesive resin AR may not extend to the thermistor TH, and the adhesive resin AR may not be formed on the thermistor TH.

Referring to FIG. 13, the coupling hole CH may be formed in an alternating pattern in a column direction (for example, L1 and L2) of the battery cell 10 or the filling hole FH to expose a pair of the adjacent battery cells 10 in the column direction (for example, L1 and L2) of the battery cell 10 or the filling hole FH. In an implementation, the first and second opening regions 131 and 132 for exposing the cooling flow paths F may be formed in the circuit board 130, and the coupling opening region 132c (or the second opening region 132) that functions as the coupling hole CH and the first opening region 131 that does not function as the coupling hole CH may be arranged in an alternating pattern in the column direction (for example, L1 and L2) of the battery cell 10 (or the filling hole FH). In an implementation, the coupling opening region 132c (or the second opening region 132) functioning as the coupling hole CH may be formed one by one between the two battery cells 10 (or filling hole FH) forming a pair in the column direction (for example, L1 and L2) of the battery cell 10 (or the filling hole FH, and the coupling opening region 132c (or the second opening region 132) functioning as the coupling hole CH may not be formed between the adjacent battery cells 10 (or the filling hole FH) that do not form a pair. In an implementation, the coupling opening region 132c (or the second opening region 132) may not be formed between the adjacent battery cells 10 in the column direction (for example, L1 and L2) of the battery cell 10 (or the filling hole FH), and may be formed at alternating positions in the column direction (for example, L1 and L2) of the battery cells 10 (or the filling holes FH) among the adjacent battery cells 10 (or the filling holes FH). In this case, the first opening region 131 for exposing the cooling flow path F penetrating a space between the adjacent battery cells 10 may be formed at a position P where the coupling opening region 132 (or the second opening region 132) is not formed, or at a position adjacent thereto among a space between the adjacent battery cells 10 or a space between the adjacent filling holes FH.

As will be described below, the filling hole FH may be formed at a central position of the upper end portion 10a of the battery cell 10, and accordingly, arranging the first and second opening regions 131 and 132 between the adjacent battery cells 10 in an alternating pattern in the column direction Z1 of the cell 10 may include arranging the first and second opening regions 131 and 132 between the adjacent filling holes FH in an alternating pattern in the column direction (for example, L1 and L2) of the filling hole FH, and arranging the first and second opening regions 131 and 132 at a position P between the adjacent filling holes FH in an alternating pattern and at a position adjacent to the position P. In an implementation, the first opening region 131 may be formed at a position adjacent to the position P between the adjacent filling holes FH rather than a position between the adjacent filling holes FH in the column direction (for example, L1 and L2) of the filling hole FH, and in this case, the first opening region 131 may still be arranged between the adjacent battery cells 10. This is because the filling hole FH is formed at a central position of the adjacent battery cells 10.

As described with reference to FIG. 4, six cooling flow paths F may be formed in an outer circumferential direction of or surround one battery cell 10. In this case, four cooling flow paths F may be formed on both sides of one battery cell 10 in the column direction Z1 of the battery cell 10, and among the four cooling flow paths, at least one of the two adjacent cooling flow paths F formed on one side of the battery cell 10 may be exposed by the first opening region 131 individually formed for each of the cooling flow paths F, and the two adjacent cooling flow paths F formed on the other side of the battery cell 10 may be exposed by the coupling opening region 132c (or the second opening region 132) formed commonly for the two cooling flow paths F. As such, the first opening region 131 may be formed at one position of a certain battery cell, and the coupling opening region 132c (or the second opening region 132) may be formed at the other position of the battery cell, and the first and second opening regions 131 and 132 may be arranged in an alternating pattern in a column direction (for example, L1 and L2) of the battery cell 10 (or the filling hole FH). In an implementation, the coupling opening region 132c (or the second opening region 132) that functions as the coupling hole CH in the column direction (for example, L1 and L2) of the battery cell 10 (or the filling hole FH), and the first opening region 131 that does not function as the coupling hole CH may be arranged to alternate with each other.

Referring to FIG. 13, the second opening region 132 extending in the outer circumferential direction of the filling holes FH in adjacent rows (for example, L1 and L2) may be formed in different shapes, and for example, the second opening region 132 extending in the outer circumferential direction of the filling hole FH in the first row L1 may extend in a downward direction toward the filling hole FH of the second row L2 from the coupling member 125 in the outer circumferential direction of the filling hole FH. In contrast to this, the second opening region 132 extending in the outer circumferential direction of the filling hole FH in the second row L2 may extend in an upward direction toward the filling hole FH of the first row L1 from the coupling member 125 in the outer circumferential direction of the filling hole FH. As such, the extending directions of the second opening regions 132 extending in the outer circumferential direction of the filling hole FH may be formed differently from each other in the filling holes FH of the first and second rows L1 and L2 adjacent to each other, and thus, it is possible to reduce interference with each other and to densely arrange the second opening regions 132 in different extension directions at a narrow space between the filling holes FH in the first and second rows L1 and L2. As such, it is described that the second opening region 132 extends in the outer circumferential direction of the filling hole FH, and in another embodiment, the filling hole FH may be omitted, and in this case, it may be understood that the second opening region 132 extends in an outer circumferential direction of a central position of the upper end portion 10a of the battery cell 10. The filling hole FH may be formed at a central position of the upper end portion 10a of each battery cell 10 to expose the bus bar 120 connected to the central position of the upper end portion 10a of each battery cell 10.

In an implementation, referring to FIG. 1, the circuit board 130 may be arranged on the upper holder 110a and may not be arranged on the lower holder 110b. In an implementation, the circuit board 130 may be selectively arranged on any one of the upper holder 110a and the lower holder 110b, e.g., the circuit board 130 may be arranged on the upper holder 110a and may collect voltage information of the multiple battery cells 10 through the upper end portion 10a of the battery cell 10. In an implementation, the circuit board 130 may collect the voltage information of the multiple battery cells 10 through any one of the upper end portion 10a and the lower end portion 10b of each of the multiple battery cells 10, e.g., the circuit board 130 may collect voltage information of the multiple battery cells 10 through the upper end portions 10a of the multiple battery cells 10. The battery cell 10 may include different first and second electrodes 11 and 12 formed on the upper end portion 10a and the lower end portion 10b, and according to one embodiment, the voltage information of the multiple battery cells 10 may be acquired through any one of the upper end portion 10 and the lower end portion 10b of the battery cell 10, e.g., the upper end portion 10a of the battery cell 10 without connecting the circuit board 130 to both the upper end portion 10a and the lower end portion 10b of the battery cell 10 to acquire the voltage information of the battery cells 10, and the entire voltage information of the battery cells 10 may be collected through the circuit board 130 selectively arranged on the upper end portion 10a of the battery cell 10, and thus, a structure of the entire battery pack may be simplified. In an implementation, an electrical connection of the battery cell 10 may be made through both the upper end portion 10a and the lower end portion 10b of the battery cell 10, and a voltage of the battery cell 10 may be measured selectively through the upper end portion 10a of the battery cell 10 among the upper end portion 10a and the lower end portion 10b of the battery cell 10.

If voltages of both sides of the upper end portion 10a and the lower end portion 10b of the battery cell 10 were to be measured, the circuit board 130 needs to be arranged on both sides of the upper end portion 10a and the lower end portion 10b of the battery cell 10, and thus, a structure of the entire battery pack may be complicated, and a separate wiring structure for connecting the circuit boards 130 on both sides may be required to collect voltage information measured from the circuit boards 130 on both sides.

Referring to FIGS. 9 and 11, in one embodiment, the potting resin PR may be formed at a position corresponding to a central portion of the upper end portion 10a or the lower end portion 10b of the battery cell 10 in a height direction of the battery cell 10, and the adhesive resin AR may be formed at a location corresponding to a rim surrounding a central portion of the upper end portion 10a or the lower end portion 10b of the battery cell 10 in a height direction of the battery cell 10. In this case, the potting resin PR and the adhesive resin AR may contain different components.

In an implementation, the bus bar 120 electrically connecting different battery cells 10 to each other may connect central portions of the upper end portions 10a of the adjacent battery cells 10 to each other. In this case, the potting resin PR may be formed on a central portion of the upper end portion 10a of the battery cell 10 and a coupling portion between the coupling pieces 120a at both ends of the bus bar 120, and in one embodiment, the potting resin PR may be injected onto the coupling pieces 120a at both ends of the bus bar 120 through the filling hole FH of the circuit board 130.

The potting resin PR may protect a coupling portion between the battery cell 10 and the coupling piece 120a of the bus bar 120 from harmful components such as oxygen and moisture by covering the coupling portion, and may protect heterogeneous materials bonded by welding, e.g., a coupling portion between the heterogeneous materials formed between the upper end portion 10a of the battery cell 10 and the coupling piece 120a of the bus bar 120 from galvanic corrosion.

The potting resin PR may be filled in the filling holes FH of the circuit board 130 which are arranged on the bus bars 120, and the filling holes FH of the circuit board 130 may expose the coupling pieces 120a at both ends of the bus bars 120 connected to the battery cells 10. For example, the filling hole FH may be formed for each battery cell 10, and two bus bar 120, each connecting two adjacent battery cells 10, may be formed for each bus bar 120, that is, one filling hole FH may be formed for each coupling piece 120a at both ends of the bus bar 120, and the potting resin PR may be filled in each filling hole FH, and thereby, the potting resin PR filled in the filling hole FH may cover a coupling portion between the battery cell 10 and the bus bar 120 (each coupling piece 120a formed at both ends of the bus bar 120). For example, the potting resin PR filled in the filling hole FH of the circuit board 130 may be injected onto the coupling piece 120a of the bus bar 120 interposed between the circuit board 130 and the battery cell 10.

In an implementation, the bus bar 120 may include the coupling pieces 120a at both ends, the central protrusion connection piece 120c connecting the coupling pieces 120a at both ends to each other, and the bent portions 120b that connect the coupling pieces 120a at both ends to the central protrusion connection piece 120c in a bent shape and supports the protrusion connection piece 120c at a level spaced apart from the battery cell 10 from the coupling pieces 120a at both ends in a height direction of the battery cell 10. In this case, the escape hole 132a for completely exposing the entire protrusion connection pieces 120c may be formed in the circuit board 130 arranged on the bus bar 120. As illustrated in FIG. 12, the protrusion connection piece 120c of the bus bar 120 and the circuit board 130 (a solid portion of the circuit board 130) may be arranged so as not to overlap each other in a height direction through the escape hole 132a formed in the circuit board 130, and thereby, the circuit board 130 may be arranged at a position close to the coupling pieces 120a of the bus bar 120, and by reducing the interval q between the circuit board 130 and the coupling pieces 120a of the bus bar 120 in a height direction, the amount of potting resin PR injected onto the coupling pieces 120a of the bus bar 120 through the filling hole FH of the circuit board 130 may be reduced, and contamination of the surroundings due to a flow of excess potting resin PR or uncontrolled potting resin PR may be prevented.

The potting resin PR may be injected onto the coupling pieces 120a at both ends of the bus bar 120 through appropriate fluidity in an uncured state and may be injected, e.g., through the filling hole FH of the circuit board 130, and may protect a coupling portion between the bus bar 120 and the battery cell 10 from external harmful components such as oxygen or moisture by performing irradiation of UV light, heating, or curing according to time after injection. In addition, the potting resin PR may insulate the upper end portion 10a of the battery cell 10 exposed through the filling hole FH of the circuit board 130 from the bus bar 120. In an implementation, the potting resin PR may include a urethane resin such as polyurethane.

FIG. 11 illustrates that the potting resin PR may be formed on the coupling portion between the upper end portion 10a of the battery cell 10 and the bus bar 120, and the potting resin PR may also be formed on a coupling portion between the lower end portion 10b of the battery cell 10 and the bus bar 120. In an implementation, the circuit board 130 may be formed selectively only on the upper end portion 10a of the battery cell 10 from among the upper end portion 10a and the lower end portion 10b of the battery cell 10 (the circuit board 130 may be arranged selectively only on the upper holder 110a from among the upper holder 110a and the lower holder 110b), and in this case, the potting resin PR may be formed on the coupling portion between the lower end portion 10b of the battery cell 10 and the bus bar 120 without passing through the filling hole FH of the circuit board 130.

Throughout the present specification, forming the potting resin PR at a position corresponding to a central portion of the upper end portion 10a or the lower end portion 10b of the battery cell 10 in a height direction of the battery cell 10 may indicate that the potting resin PR is formed on the coupling portion between the battery cell 10 and the bus bar 120 to cover the coupling portion, and may indicate a configuration in which the potting resin PR is filled in the filling hole Fh of the circuit board 130 formed on the bus bar 120.

In an implementation, in relation to the central portion of the upper end portion 10a or the lower end portion 10b of the battery cell 10 in which the potting resin PR is formed, the potting resin PR may be formed at the central portion of the upper end portion 10a or the lower end portion 10b of the battery cell 10 to which the coupling pieces 120a at both ends of the bus bar 120 are connected. In this case, the central portion of the upper end portion 10a or the lower end portion 10b of the battery cell 10 indicates a position where the coupling pieces 120a at both ends of the bus bar 120 are connected in the upper end portion 10a or the lower end portion 10b of the battery cell 10, and the central position of the upper end portion 10a or the lower end portion 10b of the battery cell 10 is not limited restrictively. In an implementation, in relation to the position where the potting resin PR is formed, the central portion of the upper end portion 10a or the lower end portion 10b of the battery cell 10 may broadly indicate an inner region excluding the rim of the upper end portion 10a or the lower end portion 10b of the battery cell 10, that is, an inner region surrounded by the rim, and may be used to distinguish between a position where one of the first and second electrodes 11 and 12 is formed and a position where another electrode is formed, according to the upper end portion 10a or the lower end portion 10b of the battery cell 10, and the central portion of the upper end portion 10a or the lower end 10b of the battery cell 10 may broadly indicate an inner region of the upper end portion 10a or the lower end portion 10b of the battery cell 10, with respect to a boundary that separates one electrode of the battery cell 10 from the other electrode. As described with reference to FIG. 3, the second electrode 12 of the battery cell 10 may be formed at the central portion of the upper end portion 10a of the battery cell 10, and the first electrode 11 may be formed in the rim of the upper end portion 10a. In this case, the central portion of the upper end portion 10a of the battery cell 10 in relation to the position where the coupling pieces 120a at both ends of the bus bar 120 are connected may indicate the second electrode 12 formed in the central portion of the upper end portion 10a of the battery cell 10.

Referring to FIGS. 9 and 10, the upper end portion 10a of the battery cell 10 may be exposed through the terminal hole 112 of the upper holder 110a to which the battery cell 10 is assembled, and the upper end portion 10a of the battery cell 10 exposed through the terminal hole 112 of the upper holder 110a may be connected to the bus bar 120 arranged on the upper holder 110a. In this case, the terminal hole 112 of the upper holder 110a and the filling hole FH of the circuit board 130 may be formed at positions corresponding to each other in the height direction of the battery cell 10. The terminal hole 112 of the upper holder 110a is for exposing the upper end portion 10a of the battery cell 10, and the filling hole FH of the circuit board 130 is for exposing the coupling pieces 120a of the bus bar 120 connected onto the upper end portion 10a of the battery cell 10, and thus, the terminal hole 112 of the upper holder 110a and the filling hole FH of the circuit board 130 may be aligned at positions corresponding to each other in the height direction of the battery cell 10. In an implementation, when the circuit board 130 is arranged on the lower holder 110b, the terminal hole 112 of the lower holder 110b and the filling hole FH of the circuit board 130 may be aligned at positions corresponding to each other.

Referring to FIGS. 10 and 11, in one embodiment, the coupling member 125 for forming a voltage measurement line between the battery cell 10 and the circuit board 130 may be connected to the rim of the upper end portion 10a of the battery cell 10. Here, the rim of the upper end portion 10a of the battery cell 10 may indicate a portion surrounding the central portion of the upper end portion 10a. The coupling member 125 may electrically connect the battery cell 10 to the circuit board 130 through the coupling hole CH of the circuit board 130, and one end portion of the coupling member 125 may form a bonding portion with the rim of the battery cell 10, and the other end portion of the coupling member 125 may form a bonding portion with the circuit board 130. In this case, the adhesive resin AR may cover the bonding portions of one end portion and the other end portion of the coupling member 125, e.g., the adhesive resin AR may continuously cover the bonding portions of the one end portion and the other end portion of the coupling member 125. In this case, the adhesive resin AR may cover the entire coupling member 125. As the adhesive resin AR covers the bonding portions of the coupling member 125 formed on the rim of the upper end portion 10a of the battery cell 10 and on the circuit board 130, the bonding portions may be protected from external impact, and as the adhesive resin AR covers the entire coupling member 125, the coupling member 125 formed of a conductive wire or a conductive ribbon may be prevented from being disconnected due to an insufficient mechanical strength.

The adhesive resin AR may cover different coupling members 125 respectively bonded to the rims of the adjacent battery cells 10 exposed through the coupling hole CH. In an implementation, the adhesive resin AR may cover together the bonding portions of one end portion and the other end portion of each of the different coupling members 125 respectively bonded to the different battery cells 10 exposed through the coupling holes CH, and may continuously cover together the bonding portions of one end portion and the other end portion of each of the different coupling members 125. In this case, the adhesive resin AR may entirely cover the different coupling members 125 respectively bonded to the different battery cells 10 exposed through the coupling holes CH. And, the adhesive resin AR may continuously cover the upper end portions 10a of the battery cells 10 exposed through the coupling holes CH while covering all of the different coupling members 125 and may electrically insulate the upper end portions 10a of the battery cells 10 exposed through the coupling holes CH. For example, the adhesive resin AR may cover the upper end portion 10a of the battery cell 10 exposed through the coupling hole CH together with the coupling member 125, thereby, electrically insulating the coupling member 125 from the upper end portion 10a of the battery cell 10.

The coupling member 125 is supported in a suspended state between one end portion bonded to the rim of the upper end portion 10a of the battery cell 10 and the other end portion connected to the circuit board 130, and the adhesive resin AR is formed continuously to cover the entire coupling member 125 together with the bonding portions formed in one end portion and the other end portion of the coupling member 125, and thereby, the coupling member 125 may be stably supported, and the coupling member 125 supported in a suspended state according to external impact may be stably supported without fluctuation.

The adhesive resin AR may include a two-liquid type curable resin containing components different from each other. In an implementation, the adhesive resin AR may include an epoxy adhesive and may include a two-liquid type curable resin containing epoxy as a main material and amine as a curable agent. For example, the adhesive resin AR may be cured by performing heating or curing according to time after being applied onto the coupling member 125, and in another embodiment, the adhesive resin AR may be cured by irradiation of UV light. As such, the cured adhesive resin AR may firmly support the entire coupling member 125 including one end portion and the other end portion of the coupling member 125. The adhesive resin AR may be applied onto the coupling member 125 through appropriate fluidity in an uncured state, and may be injected, for example, through the coupling hole CH, and may firmly support the coupling member 125 by performing irradiation of UV light, heating, or curing according to time after coating.

Referring to FIGS. 10 and 11, the adhesive resin AR may cover the rims of the upper end portions 10*a* of the adjacent battery cells 10 exposed through the coupling holes CH. In this case, the coupling hole CH may expose the hollow protrusion portion 115 connected to the cooling flow path F formed around the battery cell 10 covered by the adhesive resin AR. For example, the coupling hole CH may expose a pair of the hollow protrusion portions 115 facing each other with the coupling member 125 interposed therebetween, and in this case, the pair of hollow protrusion portions 115 may be formed between a pair of the battery cells 10 exposed through the coupling holes CH.

Throughout the present specification, forming the adhesive resin AR at a position corresponding to the rim of the upper end portion 10*a* or the lower end portion 10*b* of the battery cell 10 in the height direction of the battery cell 10 may indicate that the adhesion resin AR covers the bonding portions of the coupling member 125 formed on the rim of the battery cell 10 to, and may indicate a configuration in which the adhesive resin AR is filled in the coupling hole CH of the circuit board formed on an upper portion of the battery cell 10.

In an implementation, in relation to the rim of the upper end portion 10*a* of the battery cell 10 in which the adhesive resin AR is formed, the adhesive resin AR may be formed on the rim of the upper end portion 10*a* of the battery cell 10 to which the coupling member 125 is connected. In this case, the rim of the upper end portion 10*a* of the battery cell 10 may indicate a position where the coupling member 125 is connected among the upper end portion 10*a* of the battery cell 10, and a position of the rim of the upper end portion 10*a* of the battery cell 10 is not limited restrictively. In an implementation, in relation to the position where the adhesive resin AR is formed, the rim of the upper end portion 10*a* of the battery cell 10 may broadly indicate an outer region other than the central portion in the upper end portion 10*a* of the battery cell 10, that is, an outer region surrounding the central portion, and is for distinguishing between a position where one electrode of the first and second electrodes 11 and 12 of the battery cell 10 is formed and a position where the other electrode is formed, along the upper end portion 10*a* of the battery cell 10, and in relation to a position where the adhesive resin AR is formed, the rim of the upper end portion 10*a* of the battery cell 10 may broadly indicate the outer region of the upper end portion 10*a* of the battery cell 10 with respect to a boundary that separates one electrode of the battery cell 10 from the other electrode.

As described with reference to FIG. 3, the second electrode 12 of the first and second electrodes 11 and 12 of the battery cell 10 may be formed in a central portion of the upper end portion 10*a* of the battery cell 10, and the first electrode 11 may be formed at a rim in the upper end portion 10*a* and the lower end portion 10*b*. In this case, in relation to a position where the coupling member 125 is connected, the rim of the upper end portion 10*a* of the battery cell 10 may indicate the first electrode 11 formed at the rim of the upper end portion 10*a* of the battery cell 10.

FIG. 11 illustrates the adhesive resin AR formed on the coupling member 125 coupling the upper end portion 10*a* of the battery cell 10 to the circuit board 130. In an implementation, the circuit board 130 may be formed selectively on the upper end portion 10*a* of the battery cell 10 among the upper end portion 10*a* and the lower end portion 10*b* of the battery cell 10 (((the circuit board 130 is arranged selectively only on the upper holder 110*a* among the upper holder 110*a* and the lower holder 110*b*), and in another embodiment, the circuit board 130 may also be formed on the lower end portion 10*b* of the battery cell 10, and in this case, the adhesive resin AR may be formed on the coupling member 125 coupling the lower end portion 10*b* of the battery cell 10 to the circuit board 130.

The potting resin PR and the adhesive resin AR may contribute to other purposes, and thus, different components having different material properties may be contained therein. For example, the potting resin PR has a function of protecting a coupling portion of the bus bar 120 from harmful components such as oxygen or moisture, and accordingly, the potting resin PR may have airtightness to block penetration of the harmful components. On the other hand, the adhesive resin AR may have adhesiveness for firm attachment of the coupling member 125 to protect the coupling member 125 such as a conductive wire or a conductive ribbon from external impact.

Referring to FIGS. 14 to 16, a separation member 140 may be arranged on the cell holder 110. The separation member 140 may spatially separate the cooling flow path F of a cooling medium CM for cooling the battery cell 10 from an exhaust path of exhaust gas DG emitted from the vent portion 13 of the battery cell 10. In an implementation, the separation member 140 may spatially separate the cooling flow path F and the exhaust path from each other, and thus, it is possible to reduce a risk of explosion or ignition caused by mixing of a cooling medium CM (such as air) flowing through the cooling path F with the exhaust gas DG of a high temperature and a high pressure flowing through the exhaust path. In an implementation, in a battery pack mounted on an electric vehicle, exhaust gas DG may be blocked from flowing into the inside of a vehicle along an uncontrolled path.

Referring to FIG. 1, the separation member 140 may include the upper separation member 140*a* on the upper holder 110*a* and the lower separation member 140*b* on the lower holder 110*b*. In an implementation, the upper separation member 140*a* may be on the circuit board 130 on the upper holder 110*a*. In an implementation, the circuit board 130 may not be on the lower holder 110*b*, and thus, the lower separation member 140*b* may be directly on the lower holder 110*b*. In an implementation, the lower separation member 140*b* may be on the lower bus bar 120*b* on the lower holder 110*b*.

Referring to FIG. 14, an opening region 145 may be formed in the separation member 140 such that the cooling flow path F may penetrate therethrough. The cooling flow path F may be formed across the separation member 140 by penetrating the opening region 145 of the separation member 140 and, e.g., the cooling flow path F may penetrate the opening region 145 of the separation member 140, e.g., the hollow protrusion portion 115 of the cell holder 110 may be fitted to the opening region 145 of the separation member 140. To this end, the opening region 145 of the separation member 140 may be formed at a position corresponding to (e.g., overlying or vertically aligned with) the hollow protrusion portion 115 and may be formed in a shape corresponding to the arrangement of the hollow protrusion portion 115. In an implementation, the opening region 145 may have a circular shape corresponding to the hollow protrusion portion 115 including the circular wall body 115*a* surrounding a central hollow portion. In an implementation, the opening region 145 may have various shapes corresponding to the hollow protrusion portion 115 and may be formed in various shapes including, e.g., ovals or hexagons.

Referring to FIG. 15, in one embodiment, the opening region 145 may include a wall body 145a extending toward or in parallel with the hollow protrusion portion 115, e.g., the wall body 115a of the hollow protrusion portion 115 may be fitted to the wall body 145a of the opening region 145. In this case, the wall body 145a of the opening region 145 and the wall body 115a of the hollow protrusion portion 115 may have a circular shape corresponding to each other, may be at positions corresponding to each other, and may extend toward or alongside each other and assembled by force fitting. In an implementation, an outer circumference of the wall body 115a of the hollow protrusion portion 115 may be fitted to an inner circumference of the wall body 145a of the opening region 145, and the wall body 115a of the hollow protrusion portion 115 may be fitted to the wall body 145a of the opening region 145 by force fitting. In an implementation, the wall body 145a of the opening region 145 may have an inner circumference of a size that gradually decreases toward the hollow protrusion portion 115, or the wall body 115a of the hollow protrusion portion 115 may have an outer circumference of a size that gradually expands toward the opening region 145, and as the wall body 145a of the opening region 145 and the wall body 115a of the hollow protrusion portion 115 may have gradients to protrude toward each other, the wall body 145a of the opening region 145 and the wall body 115a of the hollow protrusion portion 115 may be forcibly assembled be fitted to each other.

A spacer 141 may be formed in the separation member 140 (e.g., on a bottom side of the separation member 140) to protrude toward the cell holder 110 and maintain an appropriate interval between the separation member 140 and the cell holder 110. In an implementation, an interval, which is maintained by the spacer 141, between the separation member 140 and the cell holder 110 may provide an exhaust path for exhaust gas emitted from the battery cell 10. As will be described below, a space between the block region 144 of the separation member 140 and the cell holder 110 may form an exhaust path for emitting exhaust gas emitted from the upper end portion 10a of the battery cell 10 or the lower end portion 10b of the battery cell 10 (e.g., the vent portion 13 in the upper end portion 10a of the battery cell 10 or the lower end portion 10b of the battery cell 10), and in this case, the spacer 141 of the separation member 140 may help maintain an appropriate interval between the separation member 140 and the cell holder 110. In an implementation, the spacer 141 on the upper separation member 140a may provide an exhaust path for exhaust gas emitted from the upper end portion 10a of the battery cell 10 while maintaining an interval between an upper surface of the upper holder 110a and the block region 144 of the upper separation member 140a, and the spacer 141 formed on the lower separation member 140b may provide an exhaust path for exhaust gas emitted from the lower end portion 10b of the battery cell 10 while maintaining an interval between a lower surface of the lower holder 110b and the block region 144 of the lower separation member 140b.

Referring to FIGS. 14 and 15, the opening regions 145 of the upper and lower separation members 140a and 140b may be formed at positions corresponding to each other to form the cooling flow paths F that penetrate at least some of the battery pack. The opening regions 145 of the upper and lower separation members 140a and 140b may form the cooling flow paths F that penetrate almost the entire configuration of a battery pack together with the hollow protrusion portion 115 of the cell holder 110 between the upper and lower separation members 140a and 140b, and the opening region 135 of the circuit board 130 between the upper and lower separation members 140a and 140b in addition to the cell holder 110. In an implementation, the cooling flow path F may penetrate the circuit board 130, the upper and lower holders 110a and 110b, and battery cell 10 fitted to the upper and lower holders 110a and 110b from the upper separation member 140a to be connected to the lower separation member 140b and may penetrate almost the entire configuration of the battery pack in the height direction. In an implementation, the opening regions 145 of the upper and lower separation members 140a and 140b and the opening regions 135 of the circuit board 130 may be formed at positions corresponding to or aligned with each other and may be formed at position corresponding to the hollow protrusion portions 115 to be fitted to the hollow protrusion portion 115 of the cell holder 110.

The separation member 140 may include the block region 144 formed at a position corresponding to the vent portion 13 of the battery cell 10. Hereinafter, the block region 144 of the upper separation member 140a will be mainly described. However, the technical matters relating to the upper separation member 140a which will described below may be applied to the lower separation member 140b in substantially the same manner.

Referring to FIG. 16, the block region 144 may be formed in the form of closing an upper portion of the vent portion 13 so that exhaust gas DG emitted from the vent portion 13 (or the terminal hole 112 exposing the vent portion 13) of the battery cell 10 does not passes through the separation member 140. In an implementation, the block region 144 may have a closed shape, and some of the separation member 140 may be opened like the opening region 145 so that upper and lower portions of the separation member 140 are in fluid communication with each other, and the upper and lower portions of the separation member 140 are separated from each other without being in fluid communication with each other through the block region 144, and as the block region 144 is formed in a closed form, the lower portion of the block region 144 in which the vent portion 13 (or the terminal hole 112 exposing the vent portion 13) is arranged is not in fluid communication with the upper portion of the block region 144 with respect to the block region 144.

In an implementation, the lower portion of the block region 144 in which the vent portion 13 (or the terminal hole 112 exposing the vent portion 13) and the upper portion of the block region 144 are separated from each other without being in fluid communication with each other with respect to the block region 144, and thus, exhaust gas DG emitted from the vent portion 13 (or the terminal hole 112 exposing the vent portion 13) may not flow out to the upper portion of the block region 144 through the block region 144. In an implementation, the exhaust gas DG emitted from the vent portion 13 (or the terminal hole 112 exposing the vent portion 13) may be blocked by the block region 144, thereby, flowing along the exhaust path between the block region 144 and the battery cell 10) and may be emitted to the outside of the battery pack along the exhaust path.

Referring to FIG. 7, in one embodiment, a group of the battery cells 10 forming a battery pack may be arranged in a vertically inverted pattern in a height direction, and may include a first group of the battery cells 10 in which the vent portion 13 is formed in the upper end portion 10a, and a second group of the battery cells 10 in which the vent portion 13 is formed in the lower end portion 10b. In this case, as illustrated in FIG. 16, the block region 144 of the upper separation member 140a arranged on an upper surface of the upper holder 110a may be formed in a closed shape so that one side of the upper separation member 140a in which the upper end portions 10a (or the vent portions 13) of the first group of battery cells 10 are arranged, and the other side of the upper separation member 140a opposite to the upper end portions 10a (or the vent portions 13) of the first group of battery cells 10 may not be fluidly connected to each other. Similarly, the block region 144 of the lower separation member 140b arranged on a lower surface of the lower holder 110b may be formed in a closed shape so that one side of the lower separation member 140b in which the lower end portions 10b (or the vent portions 13) of the second group of battery cells 10 are arranged, and the other side of the lower separation member 140b opposite to the lower end portions 10b (or the vent portions 13) of the second group of battery cells 10 may not be fluidly connected to (e.g., may not be in fluid communication with) each other.

Referring to FIG. 16, the block region 144 may be formed over the entire region of the separation member 140 excluding the opening region 145 without being limited to a position corresponding to the vent portion 13 (or the terminal hole 112 exposing the vent portion 13) of the battery cell 10. In an implementation, the block region 144 may extend to cover the entire region of the separation member 140 across a space between the opening regions 145 except for the opening region 145 for penetrating the cooling flow path F, and may form an exhaust path continuously connected to the exhaust hole DH from a position corresponding to the vent portion 13 (or the terminal hole 112 exposing the vent portion 13). In an implementation, the exhaust gas DG emitted from the vent portions 13 (or the terminal holes 112 exposing the vent portions 13) at different positions may be collected or directed into the exhaust hole DH along an exhaust path continuously formed or open between the block region 144 of the separation member 140 and the battery cell 10. In an implementation, the exhaust path may be formed between the block region 144 of the separation member 140 and the battery cell 10 or between the block region 144 of the separation member 140 and the cell holder 110 (or the circuit board 130), and may be continuously formed or open from the vent portion 13 (or the terminal hole 112 exposing the vent portion 13) of the each battery cell 10 to the exhaust hole DH on one side of the cell holder 110. In an implementation, the exhaust path may be formed in a form in which spaces between the hollow protrusion portions 115 fitted to the opening regions 145 of the separation member 140 are continuously connected (e.g., in fluid communication), and the exhaust gas DG collected into the exhaust hole DH through the exhaust path may be emitted to the outside of the battery pack. In an implementation, an exhaust path for exhaust gas emitted from the upper end portion 10a or the lower end portion 10b (or the vent portions 13 formed in the upper end portion 10a and the lower end portion 10b) of the battery cell 10 may be formed between an upper surface of the upper holder 110a and the separation member 140a and between a lower surface of the lower holder 110b and the lower separation member 140b, and may be formed in a form in which spaces between the hollow protrusion portions 115 fitted to the opening regions 145 of the upper separation member 140a and the lower separation member 140b are continuously connected.

The exhaust path of which one side is closed by the block region 144 formed in a closed form so that upper and lower portions of the separation member 140 are not connected to each other may be spatially separated from the cooling flow paths F penetrating upper and lower portions of the separation member 140 through the opening region 145 of the separation member 140. In an implementation, the separation member 140 may be formed generally in a plate shape, e.g., may have a closed plate shape except for the opening region 145 opened so that the hollow protrusion portion 115 is fitted. In this case, the cooling flow path F may be spatially separated from an exhaust path formed between the separation member 140 (the block region 144) and the battery cell 10 while penetrating the separation member 140 through the opening region 145 in a state of being surrounded by the hollow protrusion portion 115. A risk of accidents causing explosion or fire when the cooling medium CM flowing along the cooling flow path F and the exhaust gas DG of a high temperature and a high pressure flowing along the exhaust path are mixed with each other, may be reduced by the structure in which the cooling flow path F and the exhaust path are spatially separated from each other, and the battery pack mounted on an electric vehicle may block the exhaust gas DG that penetrates the separation member 140 to enter the inside of the vehicle, and thus, an occupant may be safely protected from toxic gas.

Referring to FIGS. 1 and 17, an upper duct 150a and a lower duct 150b may be arranged on the upper separation member 140a and the lower separation member 140b. An opening OP for introducing a cooling medium may be in the upper duct 150a, and the cooling medium introduced into a battery pack through the opening OP may cool the battery cell 10 while passing through the cooling flow path F formed from the upper separation member 140a up to the lower separation member. The cooling flow path F may be between the adjacent battery cells 10 to cool the battery cells 10 while flowing up and down in a height direction of the battery cells 10.

A fluid device for generating a pressure difference between the inside and outside of a battery pack may be connected to the lower duct 150b to force a flow of a cooling medium passing through the battery pack. In an implementation, a coupling portion M of a fluid device may be on one side of the lower duct 150b. In an implementation, the fluid device may be a suction type pump for forming a negative pressure inside a battery pack with respect to an external atmosphere of the battery pack. The fluid device (or the coupling portion M of the fluid device) connected to the lower duct 150b may form an outlet of the cooling medium introduced through the opening OP of the upper duct 150a. In an implementation, the opening OP of the upper duct 150a may form an inlet of the cooling medium, and the fluid device (or the coupling portion M of the fluid device) connected to the lower duct 150b may form an outlet of the cooling medium. In an implementation, the fluid device may be provided as a blower type pump, and in this case, the fluid device (or the coupling portion M of the fluid device) connected to the lower duct 150b may form an inlet of a cooling medium, and the opening OP of the upper duct 150a may form an outlet of the cooling medium.

A cooling medium may flow into the inside of a battery pack through the opening OP of the upper duct 150a according to a pressure difference between the inside and outside of the battery pack while a negative pressure is formed inside the battery pack according to an operation of a fluid device, and the cooling medium introduced into the battery pack may cool the battery cell 10 while passing through the cooling flow path F and may be emitted to the outside of the battery pack through a fluid device connected to the coupling portion M of the lower duct 150b.

In an implementation, the opening OP in the upper duct 150a and a fluid device (or the coupling portion M of a fluid device formed in the lower duct 150b) connected to the lower duct 150b may each form an inlet and an outlet of a cooling medium, and accordingly, a position of the opening OP formed in the upper duct 150a and a position (or a position of the coupling portion M formed in the lower duct 150b) of the fluid device connected to the lower duct 150b may be formed at a diagonal position diagonally crossing a battery pack.

Throughout the present specification, in relation to an inlet position and an outlet position of a cooling medium, a diagonal direction of a battery pack may indicate a direction that simultaneously follows a height direction of the battery cell 10 and the long side direction Z1 of the envelope S1 and S2 (see FIG. 4) surrounding the battery cells 10. In an implementation, when a group of the battery cells 10 forming a battery pack is surrounded by a rectangular envelope S1 and S2 (see FIG. 4) including a pair of short side S2 and a pair of long side S1 extending to linearly surround an outer periphery of a group of the battery cells 10 across an outer circumference of a group of the battery cells 10, the diagonal direction of the battery pack may indicate a direction that simultaneously follows a height direction of the battery cell 10 and the long side direction Z1 of the envelope S1 and S2. For reference, the long side direction Z1 and the short side direction Z2 of the envelope S1 and S2 may correspond to a long side direction and a short side direction of the cell holder 110, and may correspond to a long side direction and a short side direction of a battery pack.

In an implementation, it is possible to induce a flow of a cooling medium passing through the entire inside of a battery pack through the opening OP of the upper duct 150a formed at a diagonal position crossing the battery pack in a diagonal direction and a fluid device (or the coupling portion M formed in the lower duct 150b) of the lower duct 150b. In an implementation, a position of the opening OP in the upper duct 150a and a position of a fluid device (or the coupling portion M formed in the lower duct 150b) connected to the lower duct 150b may be formed at positions spaced apart (e.g., laterally) from each other in the long side direction Z1 of the envelope S1 and S2 or the long side direction Z1 of a battery pack. In an implementation, when the position of the opening OP formed in the upper duct 150a, e.g., a position of at least some of the openings OP formed in the upper duct 150a is formed at one edge in the long side direction of the battery pack, a position (or a position of the coupling portion M formed in the lower duct 150b) of a fluid device connected to the lower duct 150b may be formed at the other edge in the long side direction of the battery pack. As such, the opening OP in the upper duct 150a and a fluid device (or the coupling portion M formed in the lower duct 150b) connected to the lower duct 150b may be formed at one edge and the other edge of the battery pack in the long side direction, and thereby, a cooling medium coupling the opening OP of the upper duct 150a to a fluid device (or the coupling portion M formed in the lower duct 150b) of the lower duct 150b may be formed to flow across the entire inside of a battery pack (e.g., to be exposed to each battery cell).

As described above, the coupling portion M of the fluid device may be at one edge in the long side direction of the battery pack, and a fixed portion FX of the fluid device may be at the one edge of the battery pack in which the coupling portion M of the fluid device is formed, together with the coupling portion M of the fluid device. In an implementation, in the fluid device, a position of the fluid device may be fixed through the fixed portion FX of the fluid device while a suction hole or an air outlet of the fluid device is connected to the coupling portion M of the fluid device depending on types of the fluid device. In an implementation, the exhaust pipe DP may be at the one edge or side of the battery pack in which the coupling portion M of the fluid device is formed. The exhaust pipe DP may protrude in an installation space toward the outside of the battery pack, and the exhaust pipe DP may be at one edge of the battery pack to which the fluid device is connected, and by intensively forming the coupling portion M of the fluid device described above, the fixed portion FX of the fluid device, and the exhaust pipe DP, the other edge of the battery pack may provide a (e.g., relatively flatter) position alignment surface of the battery pack, e.g., a reference surface may be provided for position alignment with an electric vehicle in which the battery pack is mounted.

According to an embodiment, in a battery pack including electrical connections of multiple battery cells, a greatest potential difference (highest voltage) between adjacent battery cells may be reduced, and thus, the battery pack may reduce a risk of an electrical short-circuit between the adjacent battery cells and may help improve safety.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising:
    battery cells bounded by an imaginary rectangular envelope including a pair of long sides and a pair of short sides extending to linearly surround an outer periphery of the battery cells across an outer circumference of the battery cells;
    bus bars that electrically connect at least some of the battery cells to each other, the bus bars being arranged to extend in a zig-zag shape along a short side direction of the imaginary rectangular envelope;
    first and second output terminals arranged along a long side direction of the imaginary rectangular envelope and respectively adjacent to the short sides of the imaginary rectangular envelope, the first and second output terminals being connected to the bus bars; and
    first and second fuse terminals between the first and second output terminals, the first and second fuse terminals being connected to the bus bars,
    wherein:
    the battery cells include a low voltage group including a first number of battery cells and a high voltage group including a second number of battery cells, the second number being higher than the first number,
    the bus bars include a low voltage portion connecting the battery cells of the low voltage group and a high voltage portion connecting the battery cells of the high voltage group,
    the low voltage portion and the high voltage portion are formed asymmetrically with respect to a virtual line that crosses equidistantly between the first and second fuse terminals and equidistantly between the first and second output terminals, and is parallel to the short side direction of the imaginary rectangular envelope to divide the battery pack into a high voltage side and a low voltage side, and the high voltage portion includes a high voltage deflection portion that crosses the virtual line toward the low voltage portion in the long side direction of the imaginary rectangular envelope such that at least some of the battery cells of the high voltage group are completely on the low voltage side of the virtual line.

2. The battery pack as claimed in claim 1, wherein:
each of the battery cells is a circular battery cell, and
the battery cells are arranged in an offset manner such that one battery cell is partially between adjacent battery cells.

3. The battery pack as claimed in claim 1, wherein the battery cells are arranged such that:
a straight line of battery cells extend along a long side direction of the imaginary rectangular envelope; and
a zig-zag line of battery cells extend along the short side direction of the imaginary rectangular envelope.

4. The battery pack as claimed in claim 3, wherein the bus bars are arranged in the zig-zag shape while connecting adjacent battery cells along the short side direction of the imaginary rectangular envelope.

5. The battery pack as claimed in claim 4, wherein the bus bars are arranged such that:
some of the bus bars are arranged in the zig-zag shape along the short side direction of the imaginary rectangular envelope; and
remaining ones of the bus bars are arranged to extend lengthwise in the long side direction of the imaginary rectangular envelope.

6. The battery pack as claimed in claim 5, wherein a number of bus bars arranged in the zig-zag shape along the short side direction of the imaginary rectangular envelope is greater than a number of bus bars arranged to extend lengthwise in the long side direction of the imaginary rectangular envelope.

7. The battery pack as claimed in claim 1, wherein:
the battery cells include a low-potential battery cell having a lowest potential and a high-potential battery cell having a highest potential, and
the first and second output terminals are respectively connected to the low-potential battery cell and the high-potential battery cell.

8. The battery pack as claimed in claim 7, wherein the first and second fuse terminals are respectively connected to a pair of adjacent battery cells between the low-potential battery cell and the high-potential battery cell in an electrical connection direction in which the bus bars are arranged.

9. The battery pack as claimed in claim 8, wherein:
the low voltage portion of the bus bars extends from the first output terminal to the first fuse terminal; and
the high voltage portion of the bus bars extends from the second output terminal to the second fuse terminal.

10. The battery pack as claimed in claim 9, wherein:
the first fuse terminal is connected to the first output terminal in the electrical connection direction in which the bus bars are arranged, and
the second fuse terminal is connected to the second output terminal in the electrical connection direction in which the bus bars are arranged.

11. The battery pack as claimed in claim 1, wherein a number of bus bars in the high voltage portion is larger than a number of bus bars in the low voltage portion.

12. The battery pack as claimed in claim 1, wherein the low voltage portion includes a low voltage deflection portion spaced apart from the high voltage deflection portion in the short side direction of the imaginary rectangular envelope.

13. The battery pack as claimed in claim 12, wherein:
the low voltage deflection portion is arranged at a position proximate to the first and second fuse terminals in the short side direction of the imaginary rectangular envelope, and
the high voltage deflection portion is arranged at a position distal to the first and second fuse terminals in the short side direction of the imaginary rectangular envelope.

14. The battery pack as claimed in claim 12, wherein:
the high voltage deflection portion extends longer in the long side direction of the imaginary rectangular envelope than in the short side direction of the imaginary rectangular envelope, and
the low voltage deflection portion extends relatively longer in the short side direction of the imaginary rectangular envelope than in the long side direction of the imaginary rectangular envelope.

15. The battery pack as claimed in claim 1, wherein the bus bars are alternately arranged over and below the battery cells in a height direction of the battery cells.

16. The battery pack as claimed in claim 15, further comprising a cell holder in which the battery cells are accommodated,
wherein the bus bars are alternately arranged over and below the cell holder in the height direction of the battery cells.

17. The battery pack as claimed in claim 1, wherein the battery pack includes arrays of the bus bars arranged to extend in the zig-zag shape along the short side direction of the imaginary rectangular envelope, the arrays being repeatedly arranged along a long side direction of the imaginary rectangular envelope.

* * * * *